(12) United States Patent
Okazaki et al.

(10) Patent No.: US 10,158,795 B2
(45) Date of Patent: Dec. 18, 2018

(54) ELECTRONIC APPARATUS FOR COMMUNICATING WITH ANOTHER APPARATUS

(71) Applicant: Panasonic Corporation, Osaka (JP)

(72) Inventors: Yoshinori Okazaki, Osaka (JP); Koji Ishii, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/459,837

(22) Filed: Aug. 14, 2014

(65) Prior Publication Data

US 2014/0354837 A1 Dec. 4, 2014

Related U.S. Application Data

(63) Continuation of application No. PCT/JP2013/007611, filed on Dec. 26, 2013.

(30) Foreign Application Priority Data

Dec. 27, 2012 (JP) .................................. 2012-284198

(51) Int. Cl.
*H04N 5/232* (2006.01)
*H04M 1/725* (2006.01)
(Continued)

(52) U.S. Cl.
CPC ........... *H04N 5/23203* (2013.01); *H04B 5/02* (2013.01); *H04M 1/7253* (2013.01); *H04M 1/72563* (2013.01); *H04M 1/72583* (2013.01); *H04N 1/00307* (2013.01); *H04N 2101/00* (2013.01); *H04N 2201/006* (2013.01); *H04N 2201/0084* (2013.01)

(58) Field of Classification Search
CPC .................................................. H04N 5/23203
USPC ......................................................... 348/211.2
See application file for complete search history.

(56) References Cited

U.S. PATENT DOCUMENTS 8,619,159 B2 * 12/2013 Nakamura ........... H04N 1/2112
348/231.3
9,083,543 B2 * 7/2015 Oshima .................. H04B 10/11
(Continued)

FOREIGN PATENT DOCUMENTS

JP 2001-274937 A 10/2001
JP 2003-169247 A 6/2003
(Continued)

OTHER PUBLICATIONS

International Search Report for corresponding International Application No. PCT/JP2013/007611 dated Jan. 28, 2014.
(Continued)

*Primary Examiner* — Antoinette Spinks
(74) *Attorney, Agent, or Firm* — Renner Otto Boisselle & Sklar, LLP

(57) ABSTRACT

An electronic apparatus includes a display unit, a communication unit configured to read, from another electronic apparatus having a plurality of operation modes, information regarding a current operation mode of the another electronic apparatus, and a controller configured to select a user interface screen which is displayed on the display unit in accordance with the information regarding the operation mode read by the communication unit.

8 Claims, 22 Drawing Sheets

(51) Int. Cl.
*H04B 5/02* (2006.01)
*H04N 1/00* (2006.01)
*H04N 101/00* (2006.01)

(56) References Cited

U.S. PATENT DOCUMENTS

| | | | |
|---|---|---|---|
| 2001/0022913 | A1 | 9/2001 | Ohmura |
| 2005/0001024 | A1 | 1/2005 | Kusaka et al. |
| 2005/0032502 | A1 | 2/2005 | Tokudome |
| 2005/0064814 | A1 | 3/2005 | Matsuo et al. |
| 2006/0239675 | A1* | 10/2006 | Iizuka ............... H04B 10/1125 396/287 |
| 2007/0239981 | A1 | 10/2007 | Lessing |
| 2009/0253372 | A1 | 10/2009 | Naruse |
| 2010/0138745 | A1* | 6/2010 | McNamara ............ G06Q 10/06 715/720 |
| 2011/0058052 | A1* | 3/2011 | Bolton ................ H04M 1/7253 348/211.99 |
| 2013/0090946 | A1* | 4/2013 | Foo ........................ G06Q 50/22 705/3 |
| 2013/0332706 | A1 | 12/2013 | Tanaka |
| 2013/0337787 | A1* | 12/2013 | Yamada ................. H04B 10/11 455/414.1 |
| 2014/0192185 | A1* | 7/2014 | Oshima ................ H04B 10/11 348/135 |
| 2014/0354837 | A1* | 12/2014 | Okazaki ................. G06F 13/00 348/211.2 |

FOREIGN PATENT DOCUMENTS

| | | |
|---|---|---|
| JP | 2004-361464 A | 12/2004 |
| JP | 2005-045557 A | 2/2005 |
| JP | 2005-057525 A | 3/2005 |
| JP | 2006-033552 A | 2/2006 |
| JP | 2007-052555 A | 3/2007 |
| JP | 2009-253476 A | 10/2009 |
| JP | 2011-009958 A | 1/2011 |
| JP | 2011009958 A * | 1/2011 |
| JP | 2011-205255 A | 10/2011 |
| JP | 2011-248748 A | 12/2011 |
| JP | 2012-010346 A | 1/2012 |
| JP | 2012-044251 A | 3/2012 |
| WO | WO 2012/157245 A1 | 11/2012 |

OTHER PUBLICATIONS

International Preliminary Report on Patentability for corresponding International Application No. PCT/JP2013/007611 dated Jul. 9, 2015. English translation.

* cited by examiner

Fig. 6

| MODE | U/I |
|---|---|
| 0 (SHOOTING MODE) | 0 (SHOOTING MODE) |
| 1 (SINGLE IMAGE PLAYBACK MODE) | 1 (SINGLE IMAGE PLAYBACK MODE) |
| 2 (MULTI-IMAGE PLAYBACK MODE) | 2 (MULTI-IMAGE PLAYBACK MODE) |

| POSITION INFORMATION | LANDMARK INFORMATION |
|---|---|
| (x1, y1) | SIGHTSEEING INFO ABOUT OSAKA CASTLE |
| (x2, y2) | SIGHTSEEING INFO ABOUT EIFFEL TOWER |
| (x3, y3) | SIGHTSEEING INFO ABOUT STATUE OF LIBERTY |

To Arc de Triomphe
○○km
↓

Eiffel Tower
Height: ○○m

ELECTRONIC APPARATUS FOR COMMUNICATING WITH ANOTHER APPARATUS

CROSS-REVERENCE TO RELATED APPLICATIONS

This is a continuation application of International Application No. PCT/JP2013/007611, with an international filing date of Dec. 26, 2013, which claims priority of Japanese Patent Application No. JP2012-284198 filed on Dec. 27, 2012, the content of which is incorporated herein by reference.

BACKGROUND

1. Technical Field

The present disclosure relates to an electronic apparatus that can communicate with another apparatus.

2. Related Art

There is known a communication device capable of performing near field type communication. For example, the patent document JP2005-45557A discloses a communication device provided with a communication interface to perform NFC (Near Field Communication).

SUMMARY

An object of the present disclosure is to provide an electronic control device with greater convenience.

A first electronic apparatus of the present disclosure includes a display unit, a communication unit configured to read, from another electronic apparatus having a plurality of operation modes, information regarding a current operation mode of the another electronic apparatus, and a controller configured to select a user interface screen which is displayed on the display unit in accordance with the information regarding the operation mode read by the communication unit.

A second electronic apparatus of the present disclosure includes a display unit, a communication unit configured to read attribute information of a specific content from another electronic apparatus, and a controller configured to read, from a predetermined recording medium, content data having attribute information related to the attribute information read by the communication unit and display information based on the read content data on the display unit.

A third electronic apparatus of the present disclosure includes a display unit, a communication unit configured to read attribute information of a specific content from another electronic apparatus, and a controller configured to display, on the display unit, reference information as information related to the attribute information read from the communication unit.

A first display method of the present disclosure is a display method of a user interface screen on a display unit of an electronic apparatus. The method includes reading, from another electronic apparatus having a plurality of operation modes, information regarding a current operation mode of the another electronic apparatus, and selecting a user interface screen which is displayed on a display unit in accordance with the read information regarding the operation mode.

A second display method of the present disclosure is a display method of information on an electronic apparatus. The method includes storing content data in a predetermined recording medium, reading attribute information of a specific content from another electronic apparatus through communication, reading, from the predetermined recording medium, content data having attribute information related to the read attribute information, and displaying information based on the read content data on a display unit of the electronic apparatus.

A third display method of the present disclosure is a display method of information on an electronic apparatus. The method includes reading attribute information of a specific content from another electronic apparatus through communication, and displaying, on a display unit of the electronic apparatus, reference information as information related to the read attribute information.

According to the present disclosure, it is possible to provide an electronic apparatus with greater convenience.

BRIEF DESCRIPTION OF DRAWINGS

FIG. 6 is a diagram explaining a correspondence table for user interface screen data with respect to operation modes.

DETAILED DESCRIPTION OF PREFERRED EMBODIMENTS

Hereinafter, embodiments are described in detail with reference to the drawings as appropriate. However, a description which is more detailed than necessary may be omitted. For example, a detailed description of a well-known matter and a repeated description of substantially the same configuration may be omitted. This is to avoid the following description becoming unnecessarily redundant and facilitate understanding of a skilled person in the art. It is to be noted that the inventor(s) provides(provide) the attached drawings and the following description in order for the skilled person in the art to fully understand the present disclosure and does(do) not intend to provide them to restrict subject matters recited in Claims.

First Embodiment

Figure 1:
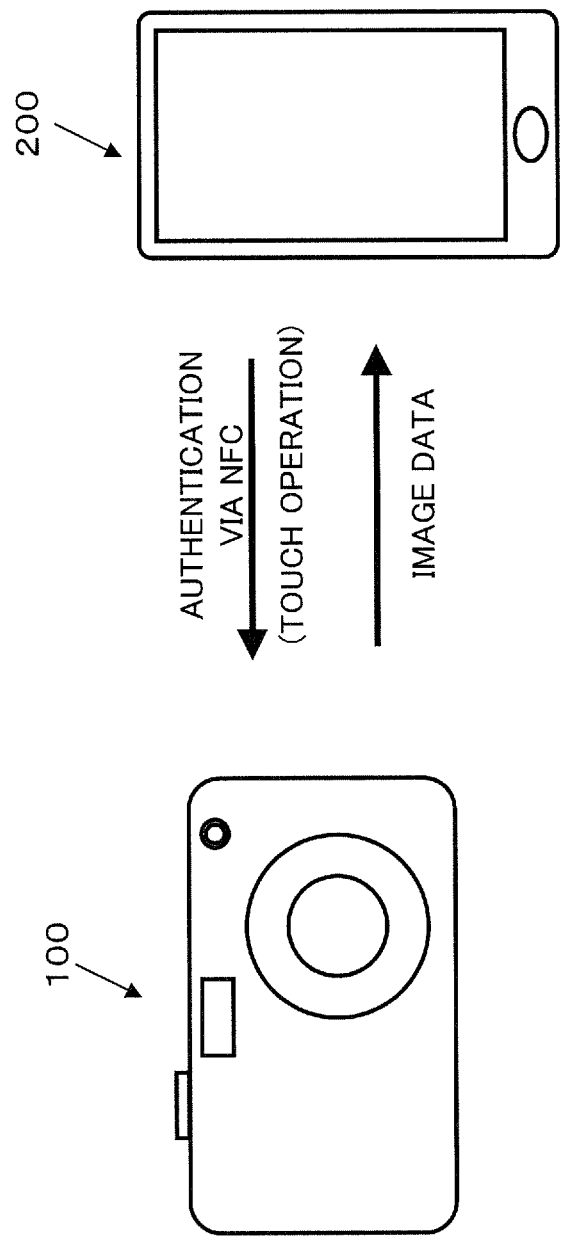
FIG. 1 is a diagram of a constitution of a system including a digital camera 100 and a smart phone 200.

FIG. 1 is a diagram of a configuration of a system including a digital camera 100 and a smart phone 200 according to the first embodiment. The smart phone 200 can read information from the digital camera 100 through a communication operation via NFC (Near Field Communication).

The smart phone 200 according to the first embodiment reads information regarding a shooting mode or a playback mode from the digital camera 100, and selects a smart phone screen from a shooting mode screen or a playback mode screen. Accordingly, when the digital camera is in the shooting mode, the smart phone can be automatically switched to the shooting mode without the user manually setting the smart phone to the shooting mode.

Hereinafter, configurations and operations of the digital camera 100 and the smart phone 200 according to the first embodiment are described.

1-1. Configuration

In the following, the configurations of the digital camera 100 and the smart phone 200 according to the first embodiment are described using the drawings.

1-1-1. Configuration of Digital Camera 100

Figure 2:
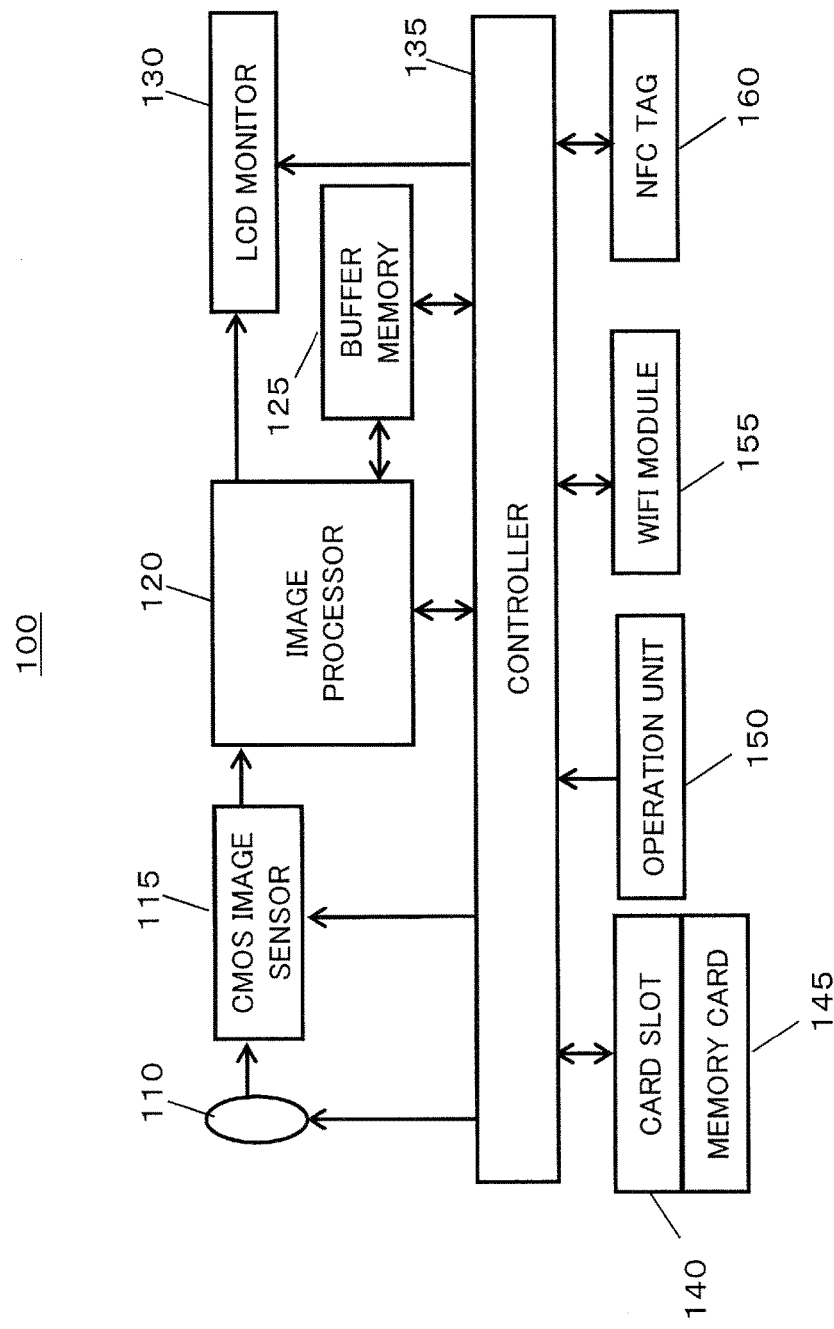
FIG. 2 is an electric constitutional diagram of the digital camera 100.

FIG. 2 is a diagram of an electric configuration of the digital camera 100. The digital camera 100 captures a subject image formed via an optical system 110, by means of a CMOS image sensor 115. The CMOS image sensor 115 generates captured data (raw data) based on the captured subject image. An image processor 120 performs a variety of processes on the captured data generated by image capturing to generate image data. A controller 135 records the image data generated in the image processor 120 in a memory card 145 inserted in a card slot 140. Further, the controller 135 can receive an operation of an operation unit 150 by a user and display (playback) the image data recorded in the memory card 140 on a liquid crystal display monitor 130.

The optical system 110 includes a focus lens, a zoom lens, an optical image stabilization (OIS) lens, a diaphragm, a shutter, and the like. Each lens included in the optical system 110 may be constituted by any number of lenses and any number of lens groups.

The CMOS image sensor 115 captures a subject image formed via the optical system 110 to generate captured data. The CMOS image sensor 115 generates a new frame of captured data at a predetermined frame rate(e.g. 30 frames/sec). Timing for generating the captured data and an electronic shutter operation in the CMOS image sensor 115 are controlled by the controller 135. It is to be noted that the imaging device is not restricted to the CMOS image sensor, and another image sensor such as a CCD image sensor or an NMOS image sensor may be used.

The image processor 120 performs a variety of processes on the captured data outputted from the CMOS image sensor 115 to generate image data. Further, the image processor 120 performs a variety of processes on the image data read from the memory card 145 to generate an image to be displayed on the liquid crystal display monitor 130. Examples of the variety of processes include white balance correction, gamma correction, a YC conversion process, an electronic zoom process, a compression process, a decompression process, and the like, but the processes are not restricted to them. The image processor 120 may be configured of a hard-wired electronic circuit, or may be configured of a microcomputer executing a program, or the like.

The liquid crystal display monitor 130 is provided on the rear surface of the digital camera 100. The liquid crystal display monitor 130 displays an image based on image data processed in the image processor 120. It should be noted that the display device is not restricted to the liquid crystal display monitor, and another display monitor such as an organic EL monitor may be used.

The controller 135 performs control of the whole operations of the digital camera 100. The controller 135 may be configured of a hard-wired electronic circuit, or may be configured of a microcomputer, or the like. Further, the controller 135 may be integrated into one semiconductor chip along with the image processor 120 and the like. Moreover, although not shown, the controller 135 has a ROM inside. The ROM stores an SSID (Service Set Identifier) and a WEP key (Wired Equivalent Privacy Key) which are necessary for establishing WiFi communication with another communication apparatus. The controller 135 can read the SSID and the WEP key from the ROM as required. Further, the ROM stores programs regarding auto focus control (AF control) and communication control and further a program for performing the control of the whole operations of the digital camera 100.

A buffer memory 125 is a storage medium that functions as working memories of the image processor 120 and the controller 135. The buffer memory 125 is realized by a DRAM (Dynamic Random Access Memory).

The card slot 140 is a connection unit where the memory card 145 can be inserted and removed. The card slot 140 can be electrically and mechanically connected with the memory card 145. The memory card 145 is an external memory including inside a record element such as a flash memory. The memory card 145 can store data such as image data generated in the image processor 120.

The operation unit 150 is a general term of hardware keys, such as an operation button and an operation lever, which are externally provided in the digital camera 100, and receives an operation by the user. Upon receipt of an operation by the user, the operation unit 150 sends the controller 135 variety of operating instruction signals.

A WiFi module 155 is a communication module that performs communication conforming to the communication standard IEEE802.11. The digital camera 100 can communicate with another communication apparatus mounted with a WiFi module via the WiFi module 155. The digital camera 100 may directly communicate with another communication apparatus, or may communicate therewith through a wireless access point, via the WiFi module 155. It is to be noted that in place of the WiFi module, any communication module that performs communication conforming to the communication standard 802.15.1, namely Bluetooth (registered trade mark) may be used. That is, as the communication module, any communication module whose communication bit rate is relative high and which can perform communication in a communication area of not smaller than several meters may be used.

An NFC tag 160 is a communication tag that performs communication conforming to the NFC standard. The digital camera 100 communicates with another communication apparatus mounted with an NFC reader/writer via the NFC tag 160, and responds to data reading and data writing from the NFC reader/writer. The NFC tag 160 is provided with an antenna, a memory and a logic circuit. The antenna of the NFC tag 160 transmits and receives a signal conforming to the NFC standard. The memory of the NFC tag 160 stores information which is read by an NFC reader/writer. Further, the NFC reader/writer writes information in the memory of the NFC tag 160. The logic circuit of the NFC tag 160 demodulates a signal received by the antenna and transmits it to the controller 135, and/or modulates a signal transmitted from the controller 135 or the memory of the NFC tag 160. Even when the NFC tag 160 is in the state of not being supplied with electric power from the inside of the digital camera 100, the NFC tag 160 can operate with electric power supplied from the NFC reader/writer having come close to the NFC tag 160 due to electromagnetic induction.

The communication area for communication conforming to the NFC standard is on the order of several centimeters. For communication via the NFC tag 160, a user of the digital camera 100 needs to bring the digital camera 100 close to another communication apparatus mounted with the NFC reader/writer such that another communication apparatus is at a distance of the order of several centimeters or less from the digital camera 100. It is to be noted that in place of the NFC tag 160, another communication unit that performs near-field wireless communication may be used.

1-1-2. Configuration of Smart Phone 200

Figure 3:
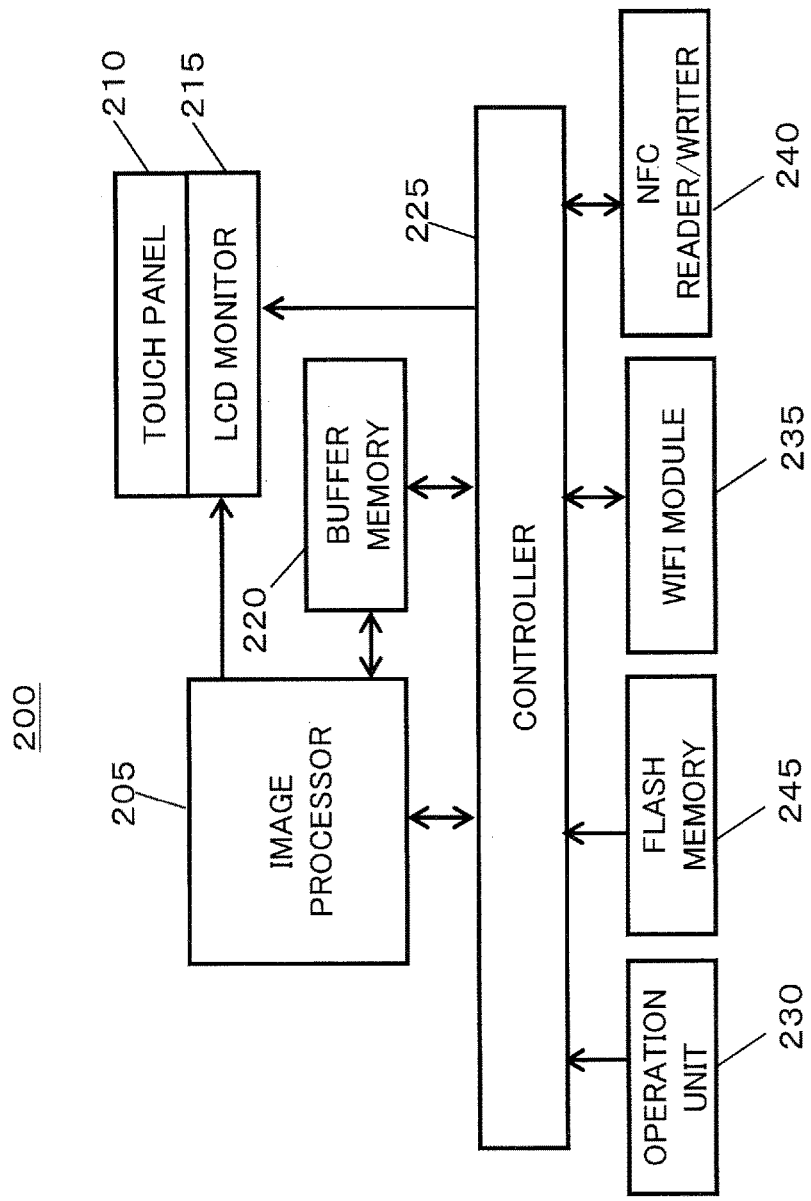
FIG. 3 is a diagram showing an electric configuration of the smart phone 200.

FIG. 3 is a diagram of an electric configuration of the smart phone 200. The smart phone 200 can display on a liquid crystal display monitor 215 an image indicated by image data generated in an image processor 205. A touch panel 210 is arranged on the surface of the liquid crystal display monitor 215, and can receive a touch operation by the user. Further, the smart phone 200 has an operation unit 230 and can receive an operation other than the operation by the touch panel 210 on the operation unit 230. A controller 225 can communicate with another communication apparatus via a WiFi module 235 and an NFC reader/writer 240.

The image processor 205 performs a variety of processes on image data read from the memory card 145 to generate an image to be displayed on the liquid crystal display monitor 215. Examples of the variety of processes include a decompression process and the like, but these are not restricted it. The image processor 205 may be configured of a hard-wired electronic circuit, or may be configured of a microcomputer using a program, or the like.

The touch panel 210 is an input device that detects a touch of a finger of the user or the like and outputs operation information to the controller 225. The touch panel 210 is arranged on the surface of the liquid crystal display monitor 215. The touch panel 210 may be a resistive type, a capacitive type, or some other type.

The liquid crystal display monitor 215 is a display device that displays a screen which is instructed from the controller 225.

A buffer memory 220 is a memory for temporarily storing information necessary for the controller 225 to perform a variety of operations.

The controller 225 controls an operation of each of units composing the smart phone 200. The controller 225 is electrically connected with the image processor 205, a touch panel 210, the liquid crystal display monitor 215, the buffer memory 220, the operation unit 230, a WiFi module 235 and a NFC reader/writer 240.

The WiFi module 235 is a communication module that performs communication conforming to the communication standard IEEE802.11. The smart phone 200 can communicate with another communication apparatus mounted with a WiFi module via the WiFi module 235. The smart phone 200 may directly communicate with another communication apparatus, or may communicate therewith through a wireless access point, via the WiFi module 235. It is to be noted that in place of the WiFi module, a communication module that performs communication conforming to the communication standard 802.15.1, namely Bluetooth (registered trade mark) may be used. That is, as the communication module, a communication module whose communication bit rate is relatively high and which can perform communication in a communication area of not smaller than several meters may be used.

The NFC reader/writer 240 is a communication reader that performs communication conforming to the NFC standard. The smart phone 200 can communicate with another communication apparatus mounted with the NFC reader/writer, or another communication apparatus mounted with the NFC tag, via the NFC reader/writer 240, to read data of the NFC tag and write data therein. The NFC reader/writer 240 is provided with an antenna, a memory and a logic circuit. The antenna of the NFC reader/writer 240 transmits and receives a signal conforming to the NFC standard. The memory of the NFC reader/writer 240 stores information which is to be written in the NFC tag. Further, the memory of the NFC reader/writer 240 stores information read from the NFC tag. The logic circuit of the NFC reader/writer 240 demodulates a signal received by the antenna and transmits it to the controller 225, or modulates a signal transmitted from the controller 225 or the memory of the NFC tag 240. Even when an NFC tag to which the NFC reader/writer 240 comes close is not supplied with electric power, the NFC reader/writer 240 can supply electric power to the NFC tag due to electromagnetic induction, enabling writing/reading of information to/from the NFC tag. It is to be noted that in place of the NFC reader/writer, another communication unit that performs near-field type wireless communication may be used.

The flash memory (hereinafter, simply referred to as "memory") 245 stores image data shot by the smart phone 200, image data transferred from the digital camera 100, and the like.

The smart phone 200 may be provided with a phone function, an internet communication function and a camera function.

1-2. Operation

A description is made to communication operations between the digital camera 100 and the smart phone 200 according to the first embodiment. In the following description, user's operation of bringing the NFC tag 160 of the digital camera 100 and the NFC reader/writer 240 of the smart phone 200 close to each other within a communication distance range for communication conforming to the NFC standard is referred to as a "touch operation". In the touch operation, the smart phone 200 (i.e., NFC reader/writer 240) may be brought close to the digital camera 100 (i.e., NFC tag 160), or vice versa.

1-2-1. Establishment of WiFi Communication

Figure 4:
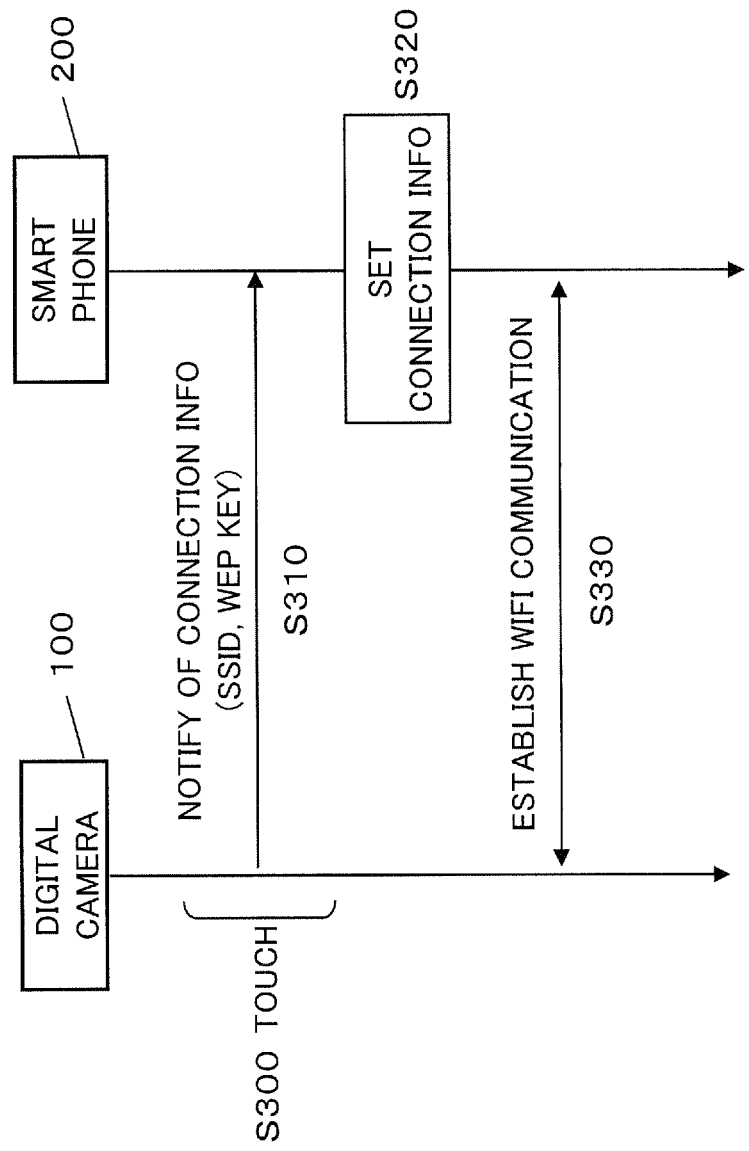
FIG. 4 is a sequence diagram regarding operations of connecting the digital camera 100 and the smart phone 200.

First, using FIG. 4, a description is made to operations related to establishment of WiFi communication between the digital camera 100 and the smart phone 200. FIG. 4 is a sequence diagram regarding operations of connecting the digital camera 100 and the smart phone 200.

When the smart phone 200 is brought into touch with the digital camera 100 (S310), the controller 225 of the smart phone 200 reads connection information (SSID, WEP key) necessary for connecting with the digital camera 100, from the controller 135 of the digital camera 100 via the NFC tag 160 and the NFC reader/writer 240 (S310). When reading the connection information, the controller 225 of the smart phone 200 sets the read connection information in the smart phone 200 (S320). Hence the controller 225 of the smart phone 200 can identify the WiFi module 155 of the digital camera 100 which the smart phone 200 communicates with, and can decode a code for communicating with the identified WiFi module 155 of the digital camera 100. Hence, the WiFi module 235 of the smart phone 200 and the WiFi module 155 of the digital camera 100 can establish WiFi communication (S330).

After WiFi communication is established as thus described, when the smart phone 200 is brought into touch with the digital camera 100 in a state where a predetermined application is being activated in the smart phone 200, a remote control of the digital camera 100 becomes possible from the smart phone 200. At this time, a user interface screen for remote control, which is displayed on the smart phone 200, is selected in accordance with an operation mode of the digital camera 100. Operations of displaying the user interface screen on the smart phone 200 are described below.

1-2-2. Display of User Interface Screen for Shooting Mode

Figure 5:
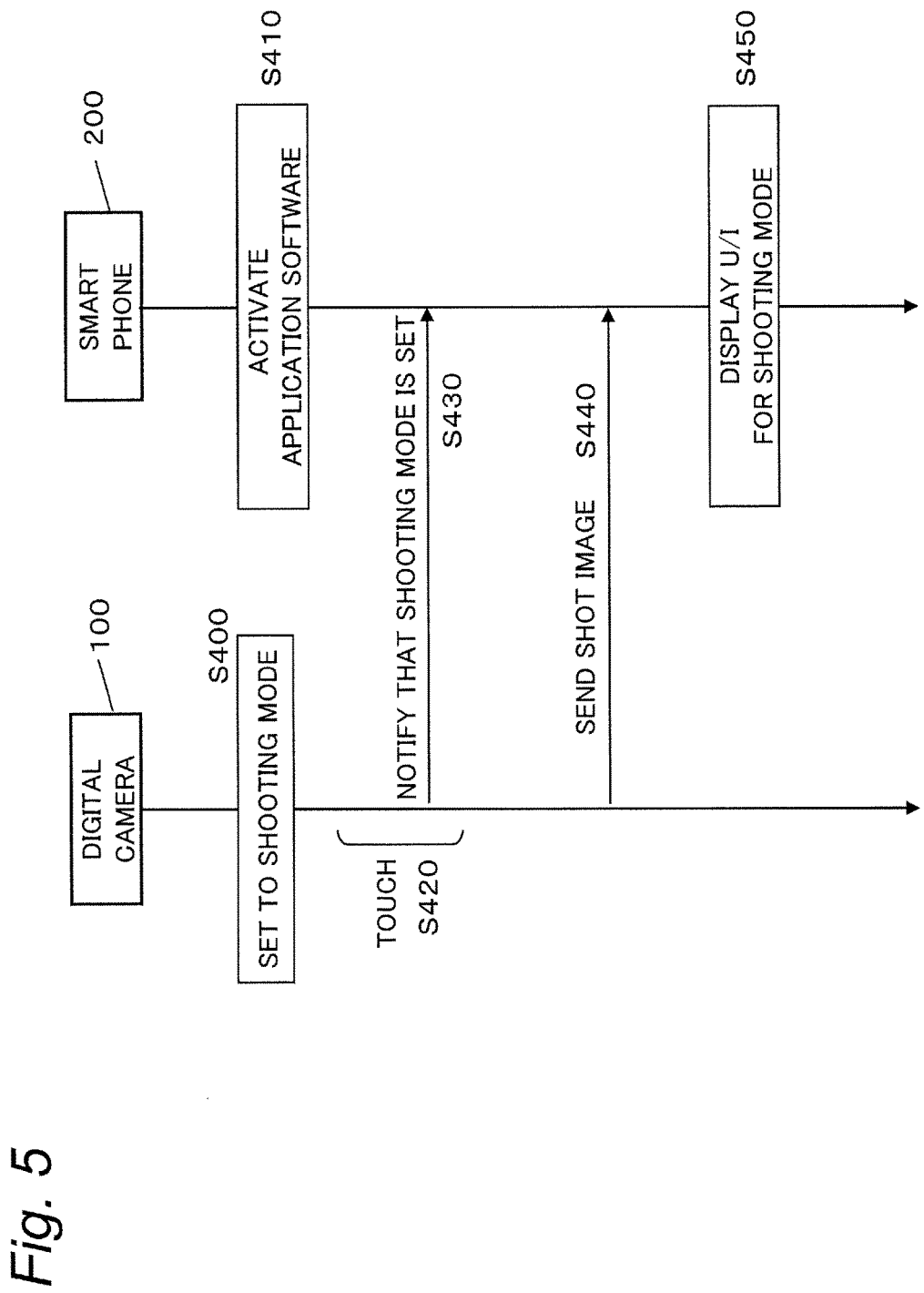
FIG. 5 is a flowchart for operations of displaying a user interface screen for a shooting-mode.

FIG. 5 is a flowchart for operations of displaying a user interface screen for shooting mode on the smart phone 200 according to the first embodiment. Using FIG. 5, a description is given to an operation of the smart phone 200 selecting and displaying a user interface screen in accordance with information regarding an operation mode setting which is read from the digital camera 100. It is assumed that the establishment of WiFi communication described in FIG. 4 is completed before the following operation of displaying the screen.

First, the user turns on a power supply of the digital camera 100, and thereafter operates a mode dial of the digital camera 100 to set the digital camera 100 in a shooting mode (S400). When set in the shooting mode, the digital camera 100 captures a subject image formed via the optical system 110, by means of the CMOS image sensor 115, and starts generating of captured data. The image processor 120 performs a variety of processes on the captured data to generate image data. The liquid crystal display monitor 130 displays a through image based on successively generated image data.

Further, the user operates the touch panel 210 of the smart phone 200 to activate application software. That is, the controller 225 of the smart phone 200 activates application software in accordance with the user's operation (S410). The application software is application software for allowing remote control of the digital camera 100 by the smart phone 200. By activating the application software, the smart phone 200 gets prepared for remote control of the digital camera 100.

Subsequently, the user brings the digital camera 100 and the smart phone 200 into touch with each other (S420). By this touch operation, the NFC reader/writer 240 of the smart phone 200 reads setting information regarding the operation mode of the digital camera 100 from the NFC tag 160 of the digital camera 100. Since the digital camera 100 is set in the shooting mode, the NFC reader/writer 240 of the smart phone 200 reads setting information indicating that the setting is the shooting mode, from the NFC tag 160 of the digital camera 100 (S430).

Subsequently, the controller 135 of the digital camera 100 transfers a through image (shot image) based on the image data which is successively generated by the CMOS image sensor 115, to the smart phone 200 via the WiFi module 155 and the WiFi module 235 (S440).

Thereafter, upon receipt of the setting information indicating that the shooting mode is set, which is read in Step S430, the controller 225 of the smart phone 200 reads data of a user interface (UI) screen for shooting-mode from the memory in the smart phone 200. The smart phone 200 has a correspondence table between the operation mode and the user interface screen, as shown in FIG. 6. By referring to the correspondence table shown in FIG. 6, the controller 225 of the smart phone 200 can select user interface screen data corresponding to the operation mode of the digital camera 100.

The controller 225 of the smart phone 200 superimposes an image indicated by data of user interface screen for shooting-mode on the through image (shot image) acquired in Step S440, to be displayed on the liquid crystal display monitor 215 (S450).

Figure 7:
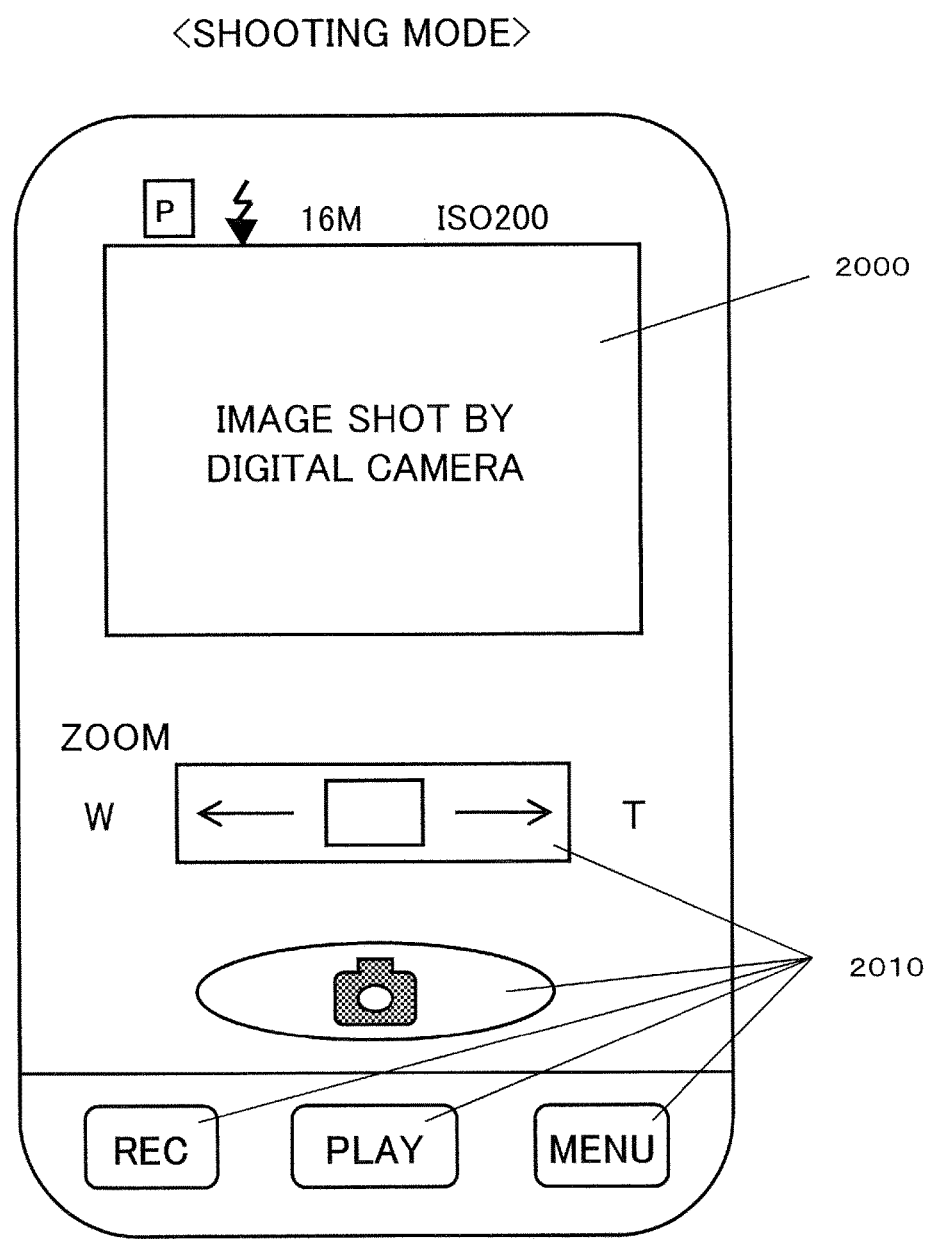
FIG. 7 is a view of a user interface screen for a shooting-mode.

FIG. 7 is a view explaining a user interface screen for shooting mode. The liquid crystal display monitor 215 of the smart phone 200 displays the user interface screen for shooting mode, as shown in FIG. 7. The user interface screen for shooting mode includes a display region 2000 and operating instruction buttons 2010 as shown in FIG. 7. The display region 2000 is a region for displaying the through image (shot image) acquired from the digital camera 100 in Step S440. The operating instruction buttons 2010 are buttons each for sending an instruction for operation to the digital camera 100. The user operates the touch panel 210 to operate any of the operating instruction buttons 2010 displayed on the liquid crystal display monitor 215. Upon receipt of this operation, the controller 225 of the smart phone 200 transmits the instruction for operation to the digital camera 100 via the WiFi module 235 and the WiFi module 155.

Upon receipt of the instruction for operation from the smart phone 200, the controller 135 of the digital camera 100 changes a shooting condition. The controller 135 of the digital camera 100 then transfers a through image (shot image) shot based on the shooting condition after the change of the shooting condition, to the smart phone 200 via the WiFi module 155 and the WiFi module 235.

As thus described, when reading the setting information indicative of the setting (shooting mode) of the digital camera 100, the smart phone 200 selects a user interface screen for shooting mode corresponding to the setting information. Accordingly, when the digital camera is in the shooting mode, the smart phone can be automatically switched to the shooting mode without the user manually making a setting.

1-2-3. Display of User Interface Screen for Playback Mode

Figure 8:
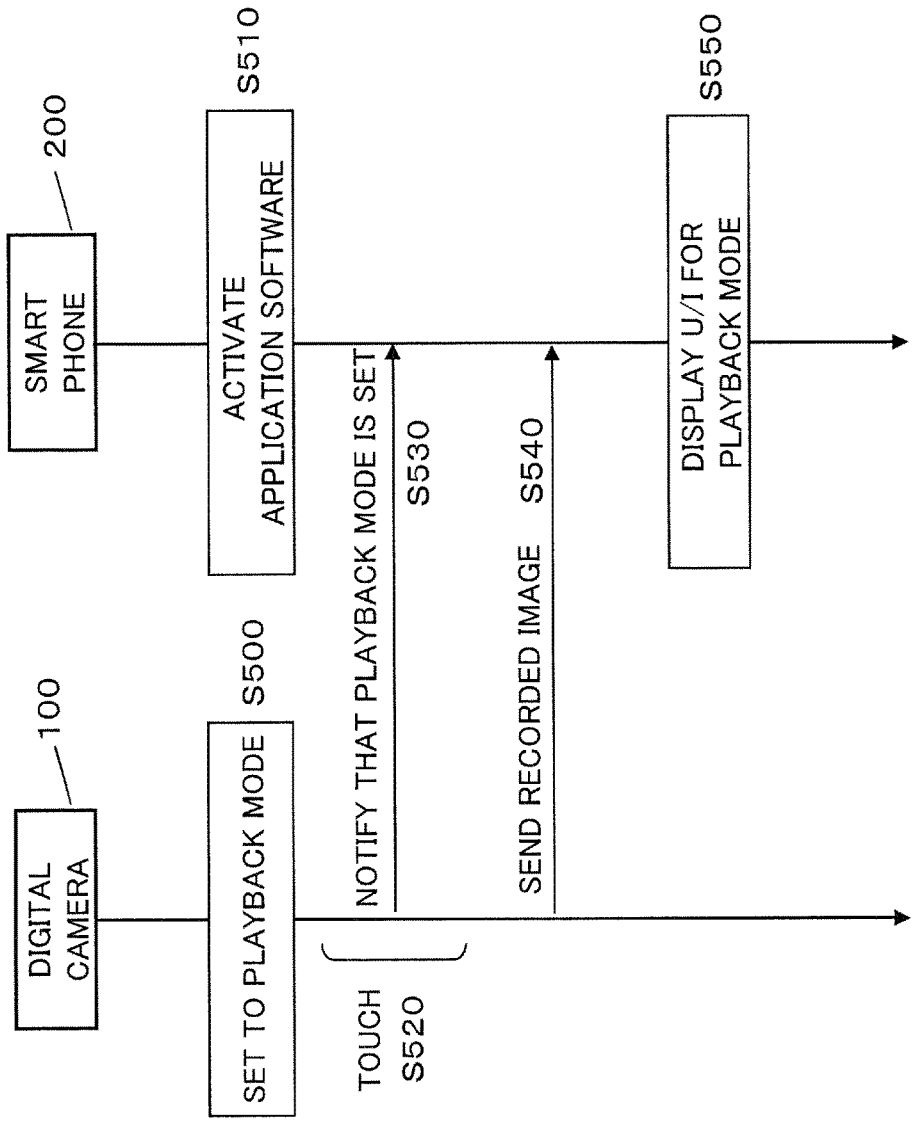
FIG. 8 is a flowchart for operations of displaying a user interface screen for a playback-mode.

FIG. 8 is a flowchart showing operations of displaying a user interface screen for playback mode in the smart phone 200 according to the first embodiment. The smart phone 200 displays the user interface screen for playback mode in accordance with information regarding a playback mode setting, which is read from the digital camera 100. It should be noted that the establishment of WiFi communication described in FIG. 4 is assumed to be completed before the operations shown in FIG. 8.

The operations regarding the playback mode from Step S500 to Step S550 in FIG. 8 are basically similar to the operations regarding the shooting mode from Step S400 to Step S450 in FIG. 6, except for the following matters.

(1) The current setting in the digital camera 100 is the "playback mode", and setting information indicates the playback mode.

(2) Image data recorded in the memory card inserted in the digital camera 100 is transferred to the smart phone 200.

(3) Upon receipt of the setting information read in Step S530, the user interface screen for playback mode is displayed.

Figure 9:
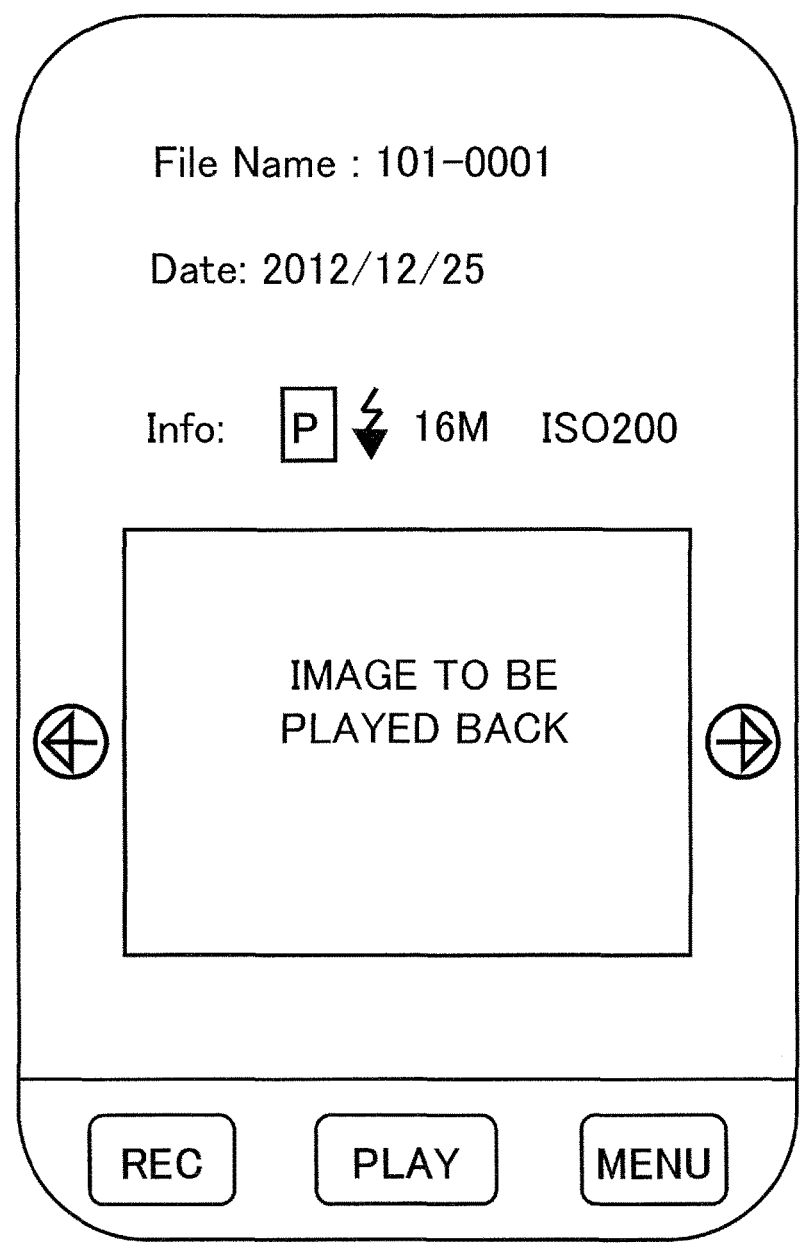
FIG. 9 is a view of a user interface screen for single image playback mode.
Figure 10:
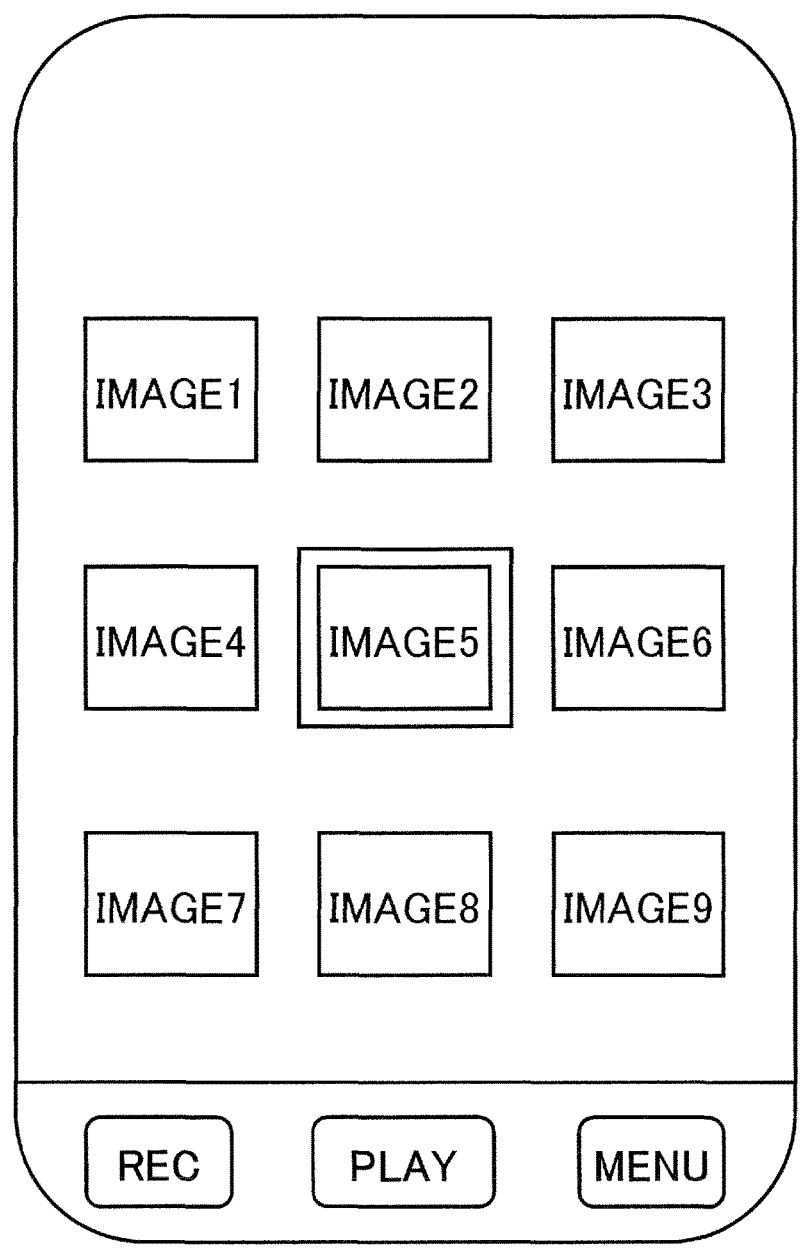
FIG. 10 is a view of a user interface screen for a multi-image playback mode.

FIGS. 9 and 10 show examples of the user interface screen for playback mode user interface screen. FIG. 9 is a view showing a user interface screen for a single image playback mode. FIG. 10 is a view showing a user interface screen for multi-image playback mode. A single image playback mode is a playback mode for displaying only one image. A multi-image playback mode is a playback mode for simultaneously displaying a plurality of images. Based on the setting information acquired in Step S530, the smart phone 200 displays a user interface screen for the corresponding playback mode in accordance with whether the current setting in the digital camera 100 is the single image playback mode or the multi-image playback mode.

As thus described, the smart phone 200 according to the first embodiment includes the liquid crystal display monitor 130, the NFC reader/writer 240 for reading information regarding the current operation mode from the digital camera 100 having a plurality of operation modes, and the controller 225 for switching the user interface screen to be displayed on the liquid crystal display monitor 130 in accordance with information regarding the operation mode read by the NFC reader/writer 240.

That is, the smart phone 200 reads information regarding the operation mode (shooting mode/playback mode) from the digital camera 100 and decides, based on the read information, the screen for shooting-mode or the screen for playback mode, as the screen to be displayed on the liquid crystal display monitor 215 of the smart phone 200. At this time, the information regarding the current mode setting in the digital camera 100 (information regarding the shooting mode/playback mode) serves as information regarding the shooting mode/playback mode which is to be read by the smart phone 200.

Accordingly, when the digital camera 100 is in the shooting mode, the smart phone 200 can be automatically switched to the shooting mode without the user manually setting the smart phone 200 in the shooting mode. This can facilitate the user to set the smart phone 200 in the shooting mode, and can further facilitate the user to perform a remote control of the digital camera 100 for shooting an image by means of the smart phone 200.

Second Embodiment

The smart phone 200 according to a second embodiment extracts an image related to attribute information (additional information) of a specific image from among images recorded in the flash memory 245 of the smart phone 200, based on the attribute information read from the digital camera 100. Then, the smart phone 200 displays a result of the extracted image on the liquid crystal display monitor 130. It is thereby possible to instantly find an image highly related to an image being displayed on the touched digital camera 100 out of the images recorded in the flash memory 245 of the smart phone 200.

Configurations of the digital camera 100 and the smart phone 200 according to the second embodiment are similar to those described in the first embodiment, and hence a detailed description thereof is omitted. The same constitutional elements as those in the first embodiment are described with the same reference numerals (the same applies to the following embodiments).

Hereinafter, operations of the digital camera 100 and the smart phone 200 according to the second embodiment are described.

(1) Case of Using Image Identifier as Attribute Information

Figure 11:
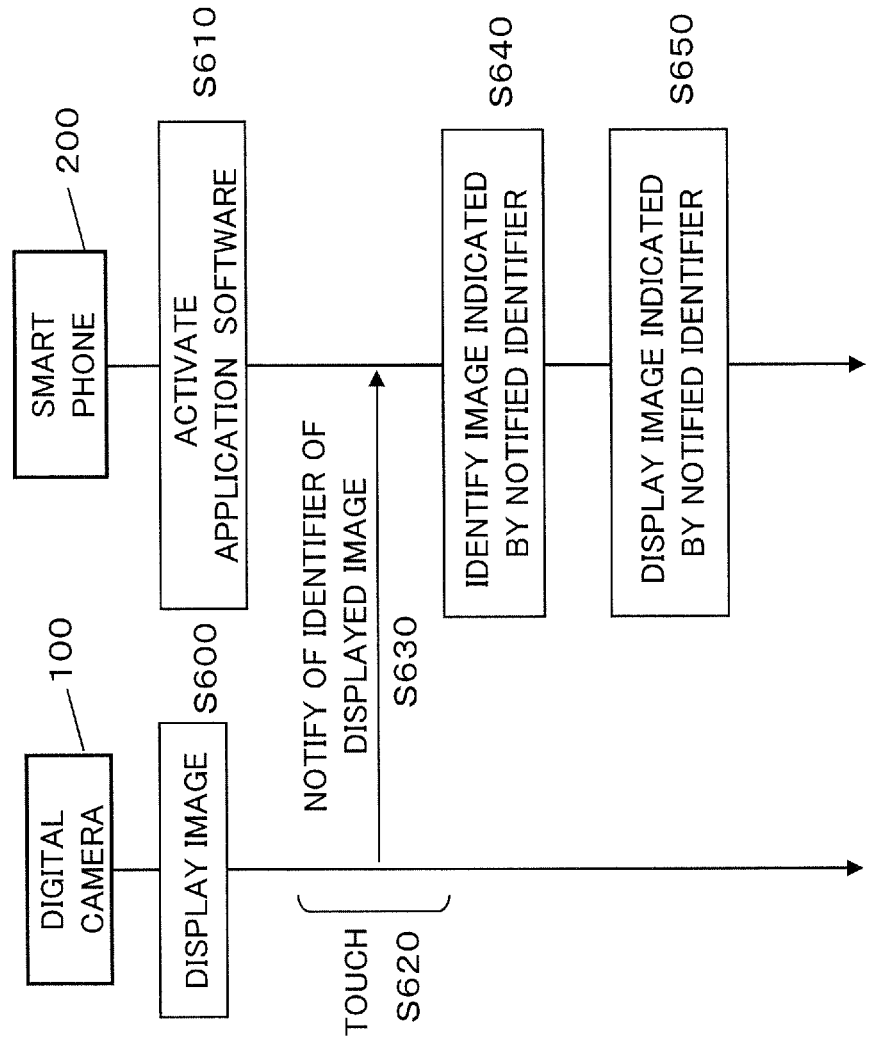
FIG. 11 is a flowchart of operation in the case of using an image identifier as attribute information (additional information).

FIG. 11 is a flowchart of an operation in the case of using an image identifier as attribute information. The user of the digital camera 100 selects image data to be searched from the memory in the smart phone 200 out of the image data recorded in the memory card 145, and displays an image indicated by the selected image data on the liquid crystal display monitor 130. That is, the controller 135 of the digital camera 100 displays an image selected by the user on the liquid crystal display monitor 130 (S600).

Figure 12:
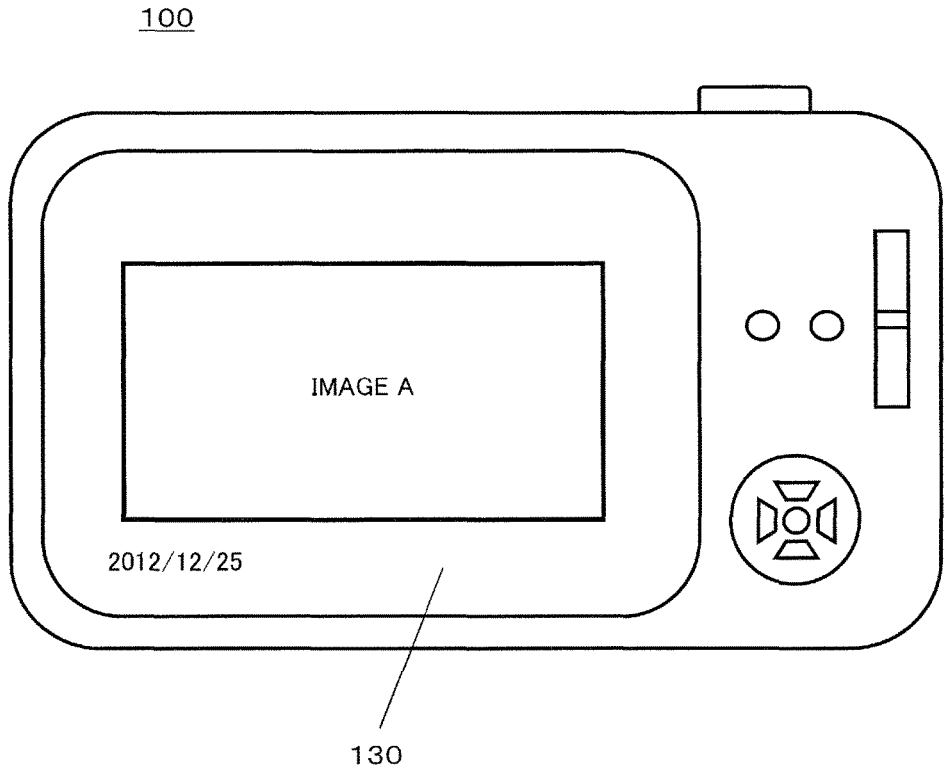
FIG. 12 is a view of a liquid crystal display monitor 130 displaying an image to be specified with the smart phone 200.

FIG. 12 is a view showing a state where an image which is used for the smart phone 200 to identify an image is displayed on the liquid crystal display monitor 130 of the digital camera 100. By displaying on the liquid crystal display monitor 130 the image which is identified by the smart phone 200, it is possible for the user to visually grasp the image to be identified by the user.

On the other hand, the user operates the touch panel 210 of the smart phone 200 to activate application software (S610). That is, the controller 225 of the smart phone 200 activates application software in accordance with the user's operation. That application software is application software (hereinafter referred to as "image search application") for searching for images recorded in the flash memory 245 in the smart phone 200 based on attribute information read by the smart phone 200 from the digital camera 100. By activating the image search application software, the smart phone 200 gets prepared for reading attribute information from the digital camera 100.

Subsequently, the user brings the digital camera 100 and the smart phone 200 into touch with each other (S620). By this touch operation, the NFC reader/writer 240 of the smart phone 200 reads, from the NFC tag 160 of the digital camera 100, an image identifier for identifying the image data being displayed on the liquid crystal display monitor 130 of the digital camera 100 as attribute information of the image data (S630). The image identifier is an identifier which is uniquely provided to image data when the image data is generated upon shooting. The image identifier is not changed even when the image data is copied or moved to another recording medium.

By referring to header information of the image data recorded in the flash memory 245, the controller 225 of the smart phone 200 checks whether or not an image having the same image identifier as the image identifier read in Step S630 exists in the flash memory 245. When the image having the same image identifier as the image identifier read in Step S630 exists in the flash memory 245, the controller 225 identifies the image (S640). The controller 225 of the smart phone 200 then displays the identified image on the liquid crystal display monitor 215 of the smart phone 200 (S650).

On the other hand, when the image having the same image identifier as the image identifier read in Step S630 is not recorded in the memory of the smart phone 200, the controller 225 of the smart phone 200 displays a message indicative of the non-existence on the liquid crystal display monitor 215.

As thus described, it is possible to instantly find the same image as the image being displayed on the touched digital camera 100 from among the images recorded in the smart phone 200. This can further facilitate finding the same image.

It is described above that the same image as the image being displayed on the touched digital camera 100 is found from among the images recorded in the memory of the smart phone 200, but the present disclosure is not limited to this. A plurality of images may be previously made associated with one another, and an image related to the image being displayed on the touched digital camera 100 may be displayed from among the images recorded in the flash memory 245 of the smart phone 200. By this method, for example, an advertisement image related to a shot image can be provided to the user.

(2) Case of Using Date Information as Attribute Information

Figure 13:
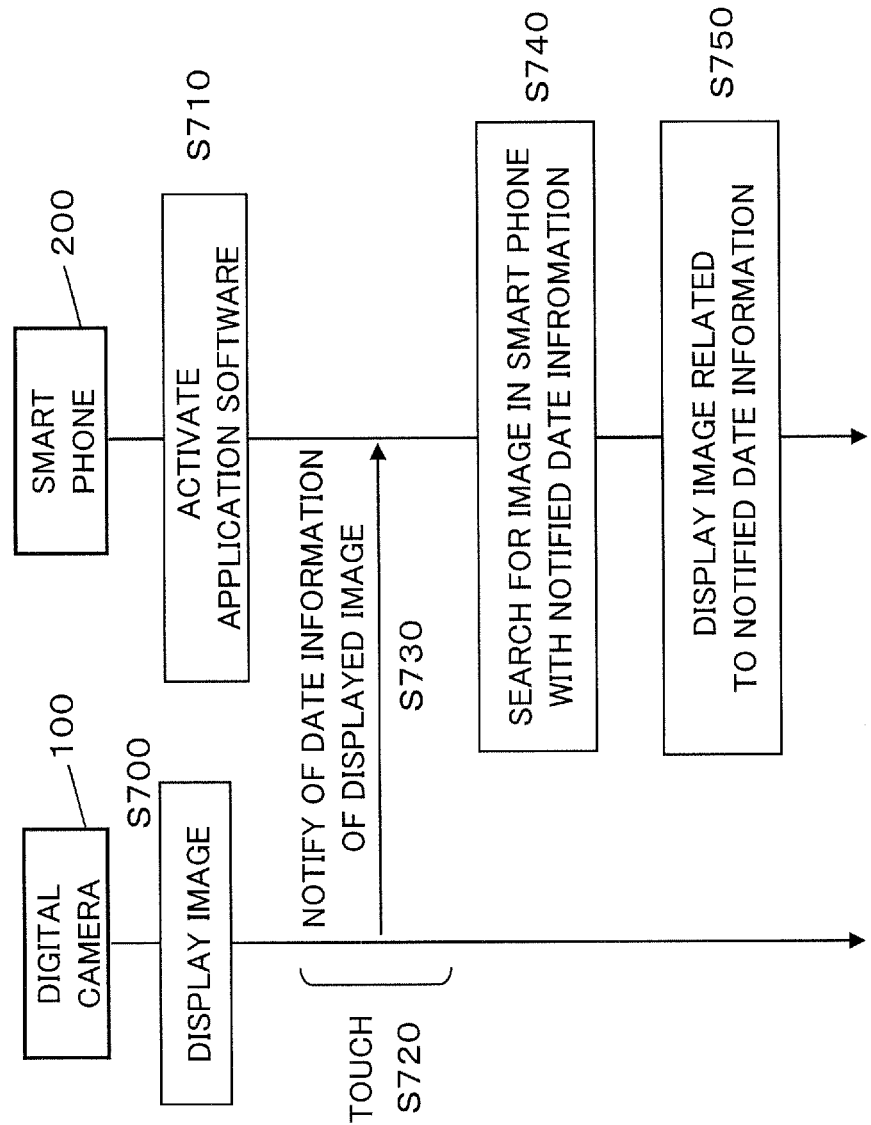
FIG. 13 is a flowchart of operation in the case of using date information as attribute information.

FIG. 13 is a flowchart of an operation in the case of using date information as attribute information. The user of the digital camera 100 selects image data which is shot on a date by which the user wishes to search for the image from the image data recorded in the memory card 145, from the image data recorded in the flash memory 245 of the smart phone 200, and displays an image indicated by the selected image data on the liquid crystal display monitor 130. That is, the controller 135 of the digital camera 100 displays an image selected by the user on the liquid crystal display monitor 130 (S700).

On the other hand, the user operates the touch panel 210 of the smart phone 200 to activate the image search application software (S710). That is, the controller 225 of the smart phone 200 activates the image search application software in accordance with the user's operation.

Subsequently, the user brings the digital camera 100 and the smart phone 200 into touch with each other (S720). By this touch operation, the NFC reader/writer 240 of the smart phone 200 reads information of a date on which the image data being displayed on the liquid crystal display monitor 130 of the digital camera 100 was shot, as attribute information of the image data, from the NFC tag 160 of the digital camera 100 (S730).

Figure 14:
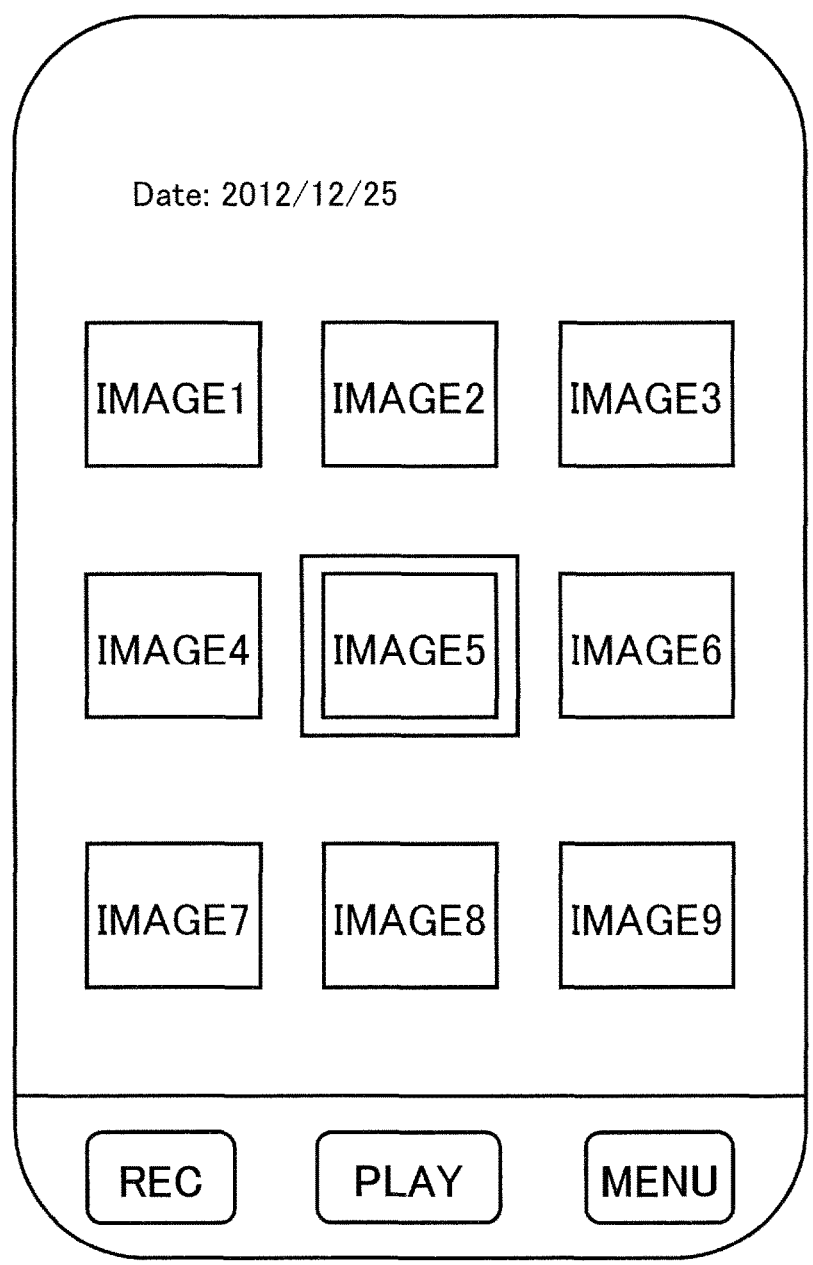
FIG. 14 is a view showing a multi-image display on a liquid crystal display monitor 215.

By referring to header information of the image data recorded in the flash memory 245 in the smart phone 200, the controller 225 of the smart phone 200 determines whether or not an image shot on the same date as the date read in Step S730 exists in the memory (S740). When the image shot on the same date as the date read in Step S730 exists, the controller 225 of the smart phone 200 displays the image on the liquid crystal display monitor 215 of the smart phone 200 (S750). When a plurality of images shot on the same date as the date read in Step S730 exist, those images are displayed on the liquid crystal display monitor 215 so that multiple images are displayed simultaneously, as shown in FIG. 14.

On the other hand, when the image shot on the same date as the date read in Step S730 does not exist, the controller 225 of the smart phone 200 displays a message indicative of the non-existence on the liquid crystal display monitor 215 of the smart phone 200.

As thus described, it is possible to collectively search for images with the same date as that of the image being displayed on the touched digital camera 100 from the images recorded in the smart phone 200. This can further facilitate finding an image with the same date, thereby to further facilitate sharing the image with another user. Moreover, it can further facilitate image edition of group of images having the same date. In the above description, an image with the same date as that of the image being displayed on the touched digital camera 100 is searched, but an image with the same year and month or the same year of the shot date may be searched in accordance with the setting by the user.

(3) Case of Using Personal Authentication Information as Attribute Information

Figure 15:
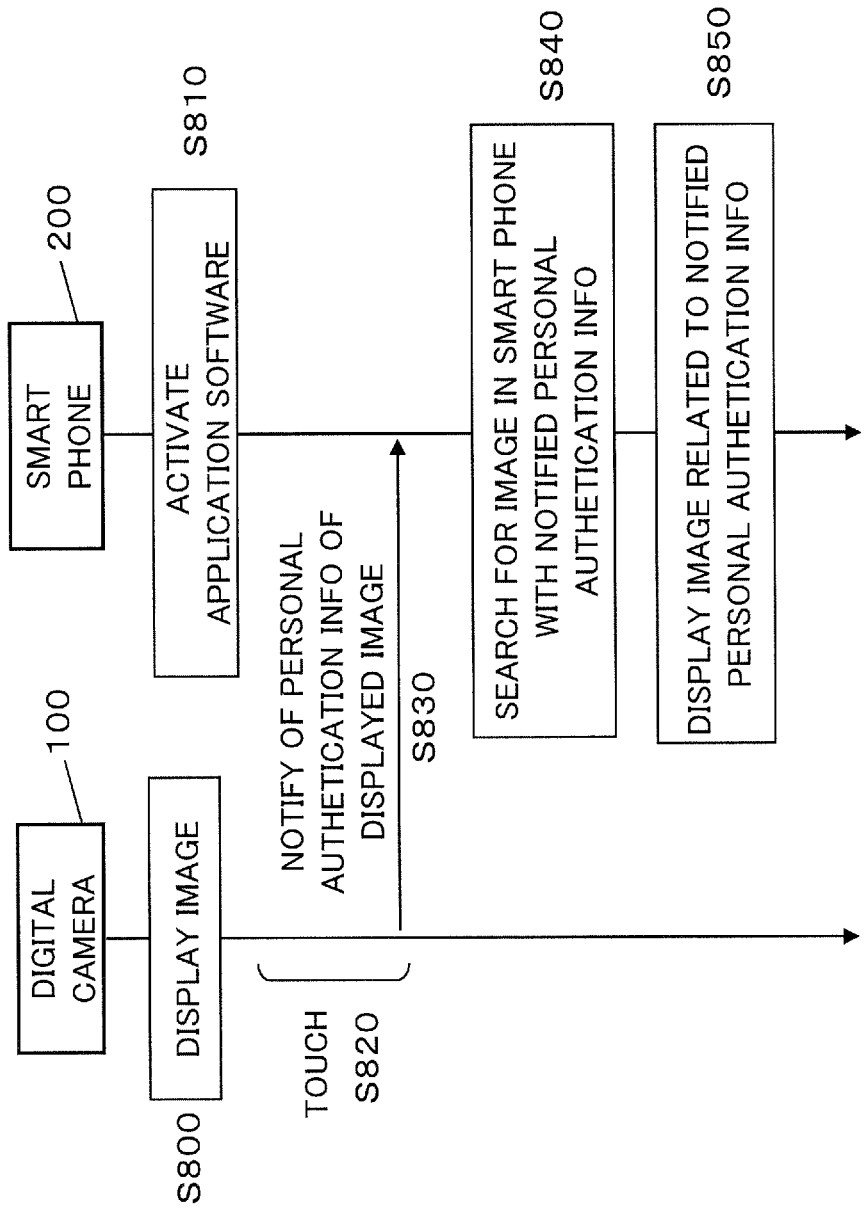
FIG. 15 is a flowchart of operation in the case of using personal authentication information as attribute information.

FIG. 15 is a flowchart of an operation in the case of using personal authentication information as attribute information. Personal authentication information of a person in an image displayed on the liquid crystal display monitor 130 of the digital camera 100 serves as attribute information which is to be read by the smart phone. The personal authentication information is, for example, information indicative of a feature of a face. Based on the personal authentication information acquired from the digital camera 100, the controller 225 of the smart phone 200 displays, on the liquid crystal display monitor 215 of the smart phone 200, an image related to the personal authentication information among the images in the flash memory 245 of the smart phone 200. Operations in Steps S800 to Step S850 shown in FIG. 15 are similar to the operations in Step S700 to Step S750 shown in FIG. 13, and hence a detailed description thereof is omitted.

As thus described, it is possible to collectively search for an image including the same personal authentication information as that of the image being displayed on the touched digital camera 100 out of the images recorded in the flash memory 245 of the smart phone 200. This can further facilitate finding an image that includes the same personal authentication information, thereby to further facilitate sharing the image with another user. Moreover, it can further facilitate image edition of group of images in which the same person is shot.

(4) Case of Using Geographic Position Information as Attribute Information

Figure 16:
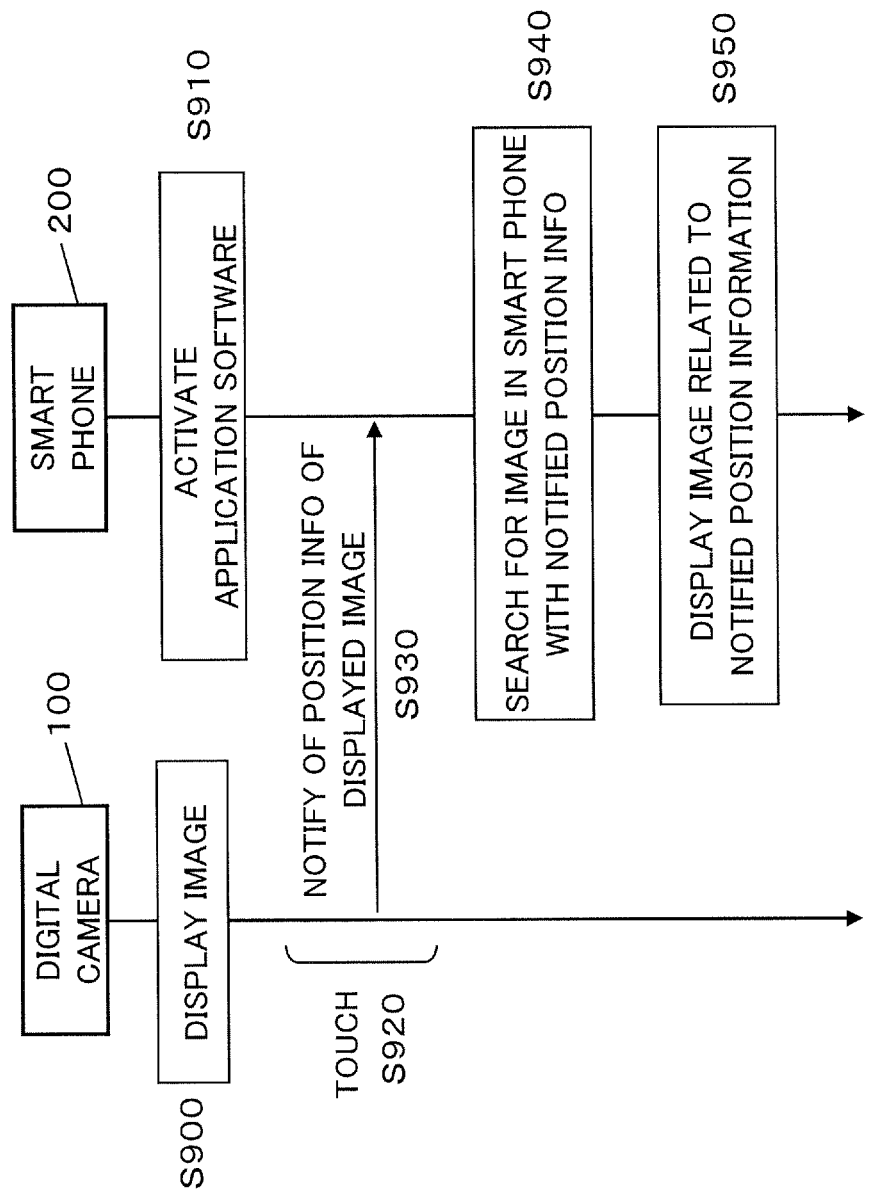
FIG. 16 is a flowchart of operation in the case of using position information indicative of a geographic position in which shooting was performed, as attribute information.

FIG. 16 is a flowchart of an operation in the case of using position information indicative of a geographic position at which image is shot, as attribute information. Position information indicative of a geographic position where an image displayed on the liquid crystal display monitor 130 of the digital camera 100 was shot serves as attribute information which is to be read by the smart phone 200. Based on the position information acquired from the digital camera 100, the smart phone 200 displays, on the screen of the smart phone 200, an image related to the position information out of the images in the flash memory 245 of the smart phone 200. It is to be noted that the image related to the position information includes an image having a position same as a position indicated by the position information and/or within a predetermined range from a position indicated by the position information. Operations in Steps S900 to Step S950 shown in FIG. 16 are similar to the operations in Step S700 to Step S750 shown in FIG. 13, and hence a detailed description thereof is omitted.

As thus described, it is possible to collectively search for an image including position information of the position same as or close to that of the image being displayed on the touched digital camera 100 out of the images recorded in the flash memory 245 in the smart phone 200. This can further facilitate finding an image that includes position information of the same position or a close position, thereby to further facilitate sharing the image with another user. Moreover, it can further facilitate image edition of group of images shot in the same shooting position.

(5) Case of Using Shooting Scene Information as Attribute Information

Figure 17:
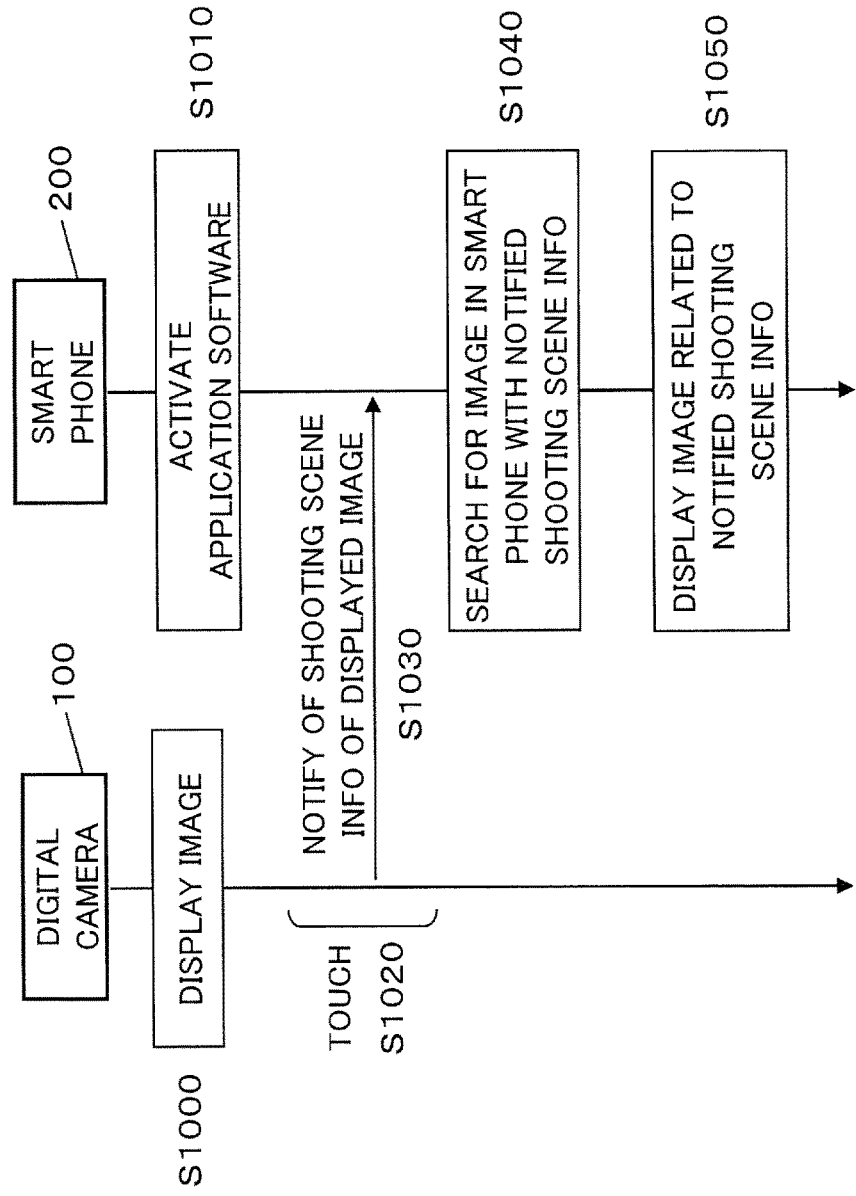
FIG. 17 is a flowchart of operation in the case of using scene information for an image which has been shot, as attribute information.

FIG. 17 is a flowchart of an operation in the case of using shooting scene information for shooting an image, as attribute information. Shooting scene information indicative of a scene mode which is used at the time of shooting an image displayed on the liquid crystal display monitor 130 of the digital camera 100 serves as attribute information which is to be read by the smart phone 200. The shooting scene information is information indicative of a scene mode used at the time of shooting and, for example, includes shooting scene information indicative of being sunset shooting and shooting scene information indicative of being night view shooting. Based on the shooting scene information acquired from the digital camera 100, the smart phone 200 displays, on the screen of the smart phone 200, an image having the same shooting scene information as the acquired shooting scene information out of the images in the flash memory 245 of the smart phone 200. Operations in Steps S1000 to Step S1050 shown in FIG. 17 are similar to the operations in Step S700 to Step S750 shown in FIG. 13, and hence a detailed description thereof is omitted.

As described above, the smart phone 200 according to the present embodiment includes the liquid crystal display monitor 215, the NFC reader/writer 240 for reading attribute information of a specific image (specific content) from the digital camera 100, and the controller 225 for reading, from the flash memory 245, image data (content data) having attribute information related to the attribute information read by the NFC reader/writer 240 and displaying an image (information) based on the read image data on the liquid crystal display monitor 215.

That is, it is possible to collectively search for an image including the same shooting scene information as that of the image being displayed on the touched digital camera 100 out of the images recorded in the flash memory 245 in the smart phone 200. This can further facilitate finding an image that includes the same shooting scene information, thereby to further facilitate sharing the image with another user. Moreover, it can further facilitate image edition of group of images having the same shooting scene.

It should be noted that in the above description, in the case of using the geographic position information or the shooting scene information as the attribute information, the attribute information of the image displayed on the liquid crystal display monitor 130 of the digital camera 100 is the attribute information which is to be read by the smart phone 200, but the reading method of the geographic position information or the shooting scene information is not limited to this. For example, the smart phone 200 may be configured to read shooting scene information which is manually inputted in the digital camera 100. Alternatively, the smart phone may be configured to read the current position information indicated by a GPS mounted in the digital camera 100. In this case, it is enough that the GPS is being activated, and the digital camera need not necessarily perform the image display operation.

Third Embodiment

Figure 18:
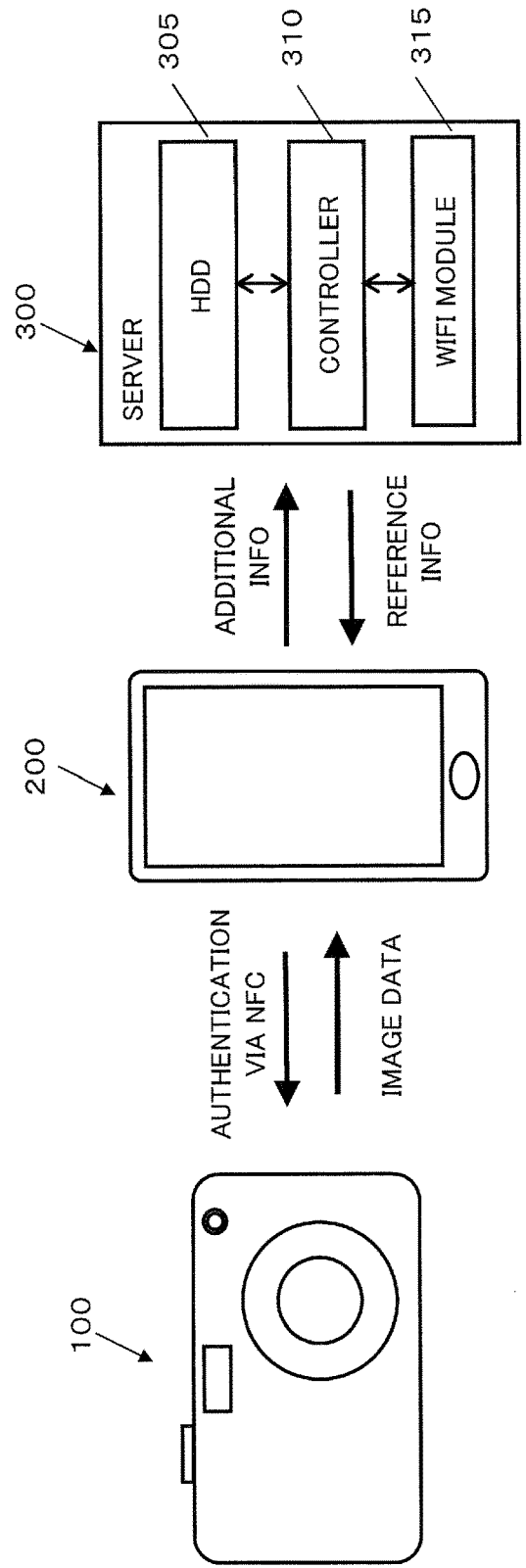
FIG. 18 is a diagram of an electric constitution of a cloud server 300.

The smart phone 200 according to a third embodiment displays, on the liquid crystal display monitor 215 of the smart phone 200, reference information as information related to a specific image read from the digital camera 100. Therefore, the smart phone 200 according to the third embodiment decides reference information which is displayed on the liquid crystal display monitor 130 of the smart phone 200, based on attribute information of the specific image read from the digital camera 100. In deciding the reference information, the smart phone 200 notifies the cloud server 300 of the attribute information of the specific image read from the digital camera 100, as shown in FIG. 18. Upon receipt of the notified attribute information, the cloud server 300 sends reference information to the smart phone 200. This can facilitate the smart phone 200 to acquire the reference information related to the attribute information of the image displayed on the touched digital camera 100 out of the images recorded in the flash memory 245. It can thus facilitate the user to refer to the reference information related to the attribute information of the image being displayed on the touched digital camera 100.

The configurations of the digital camera 100 and the smart phone 200 according to the third embodiment are similar to the configurations of them described in the first embodiment, and hence a detailed description thereof is omitted.

A configuration of the cloud server 300 is described using FIG. 18.

The cloud server 300 is a host computer existing on the computer network, and provides a service of responding to a request from a client server such as the smart phone 200. The cloud server 300 is provided with an HDD (Hard Disk Drive) 305, a controller 310, a WiFi module 315, and the like. The HDD 305 is a large capacity recording medium. The HDD 305 records a variety of data such as image data. The controller 310 performs whole control of the cloud server 300. Further, the controller 310 processes a variety of requests from the client computer which have been acquired via the WiFi module 315.

The WiFi module 315 is a communication module that performs communication conforming to the communication standard IEEE802.11. The cloud server 300 can communicate with the client computer mounted with the WiFi module via the WiFi module 315. It is to be noted that the communication unit of the cloud server 300 is not restricted to a wireless communication unit such as the WiFi module, but it may be a wired communication unit. However, in the case of using the wired communication unit, when it is to communicate with a smart phone 200A or a smart phone 200B each mounted with the WiFi module, needless to say, a relay device such as a rooter which switches the communication unit from a wireless state to a wired state is required.

(1) Case of Reference Information being Map Image

Figure 19:
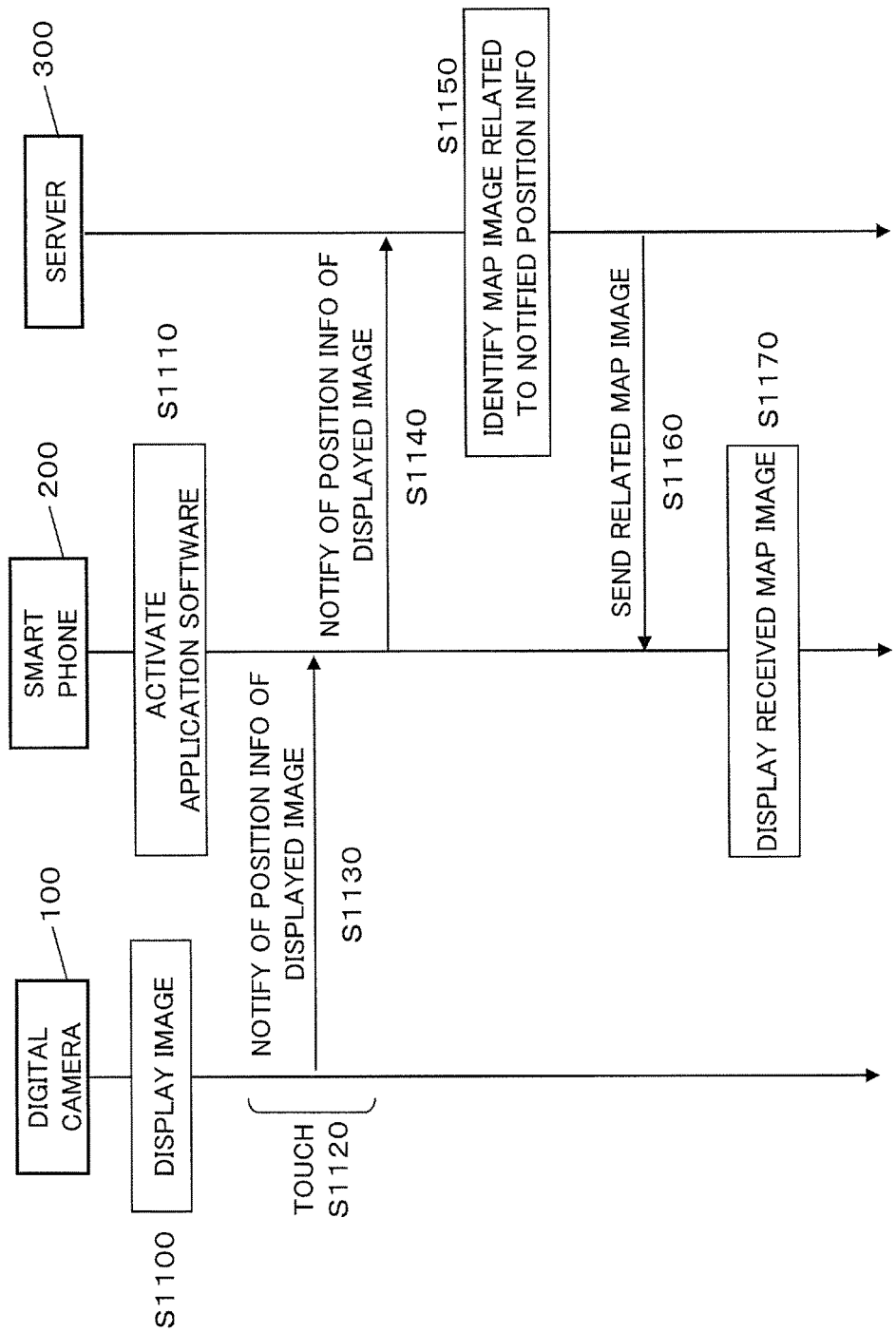
FIG. 19 is a flowchart of operation in the case of acquiring a map image as reference information.

FIG. 19 is a flowchart showing operations in the case of acquiring a map image as reference information in the present system. The user of the digital camera 100 selects image data with which a map image is to be acquired, out of the image data recorded in the memory card 145, and displays an image indicated by the selected image data on the liquid crystal display monitor 130. That is, the controller 135 of the digital camera displays an image selected by the user on the liquid crystal display monitor 130 (S1100).

On the other hand, the user operates the touch panel 210 of the smart phone 200 to activate application software. That is, the controller 225 of the smart phone 200 activates application software in accordance with the user's operation (S1110). This application software is application software for acquiring a map image from the server 300 based on position information of image data read by the smart phone 200 from the digital camera 100. By activating the application software, the smart phone 200 gets prepared for reading position information from the digital camera 100.

Subsequently, the user brings the digital camera 100 and the smart phone 200 into touch with each other (S1120). By this touch operation, the NFC reader/writer 240 of the smart phone 200 reads, from the NFC tag 160 of the digital camera 100, position information indicative of a geographic position where the image data being displayed on the liquid crystal display monitor 130 of the digital camera 100 was shot (S1130).

The controller 225 of the smart phone 200 notifies the controller 310 of the cloud server 300 of the position information read from the digital camera 100 via the WiFi module 235 and the WiFi module 315 (S1140). The HDD 305 of the cloud server 300 stores map images of the respective countries all over the world and the respective regions of each country in association with information regarding geographic positions. The controller 310 of the cloud server 300 identifies a map image related to the geographic position indicated by the notified position information, out of the map images stored in the HDD 305 (S1150).

The controller 310 of the cloud server 300 transfers the identified map image to the controller 225 of the smart phone 200 via the WiFi module 315 and the WiFi module 235 (S1160). The controller 225 of the smart phone 200 displays the received map image on the liquid crystal display monitor 215 (S1170).

Accordingly, the smart phone 200 can easily acquire the map image regarding the position indicated by the position information of the image being displayed on the liquid crystal display monitor 130 of the touched digital camera 100. This can further facilitate grasping of a place where an image was shot.

(2) Case of Reference Information being Landmark Information

Figure 20:
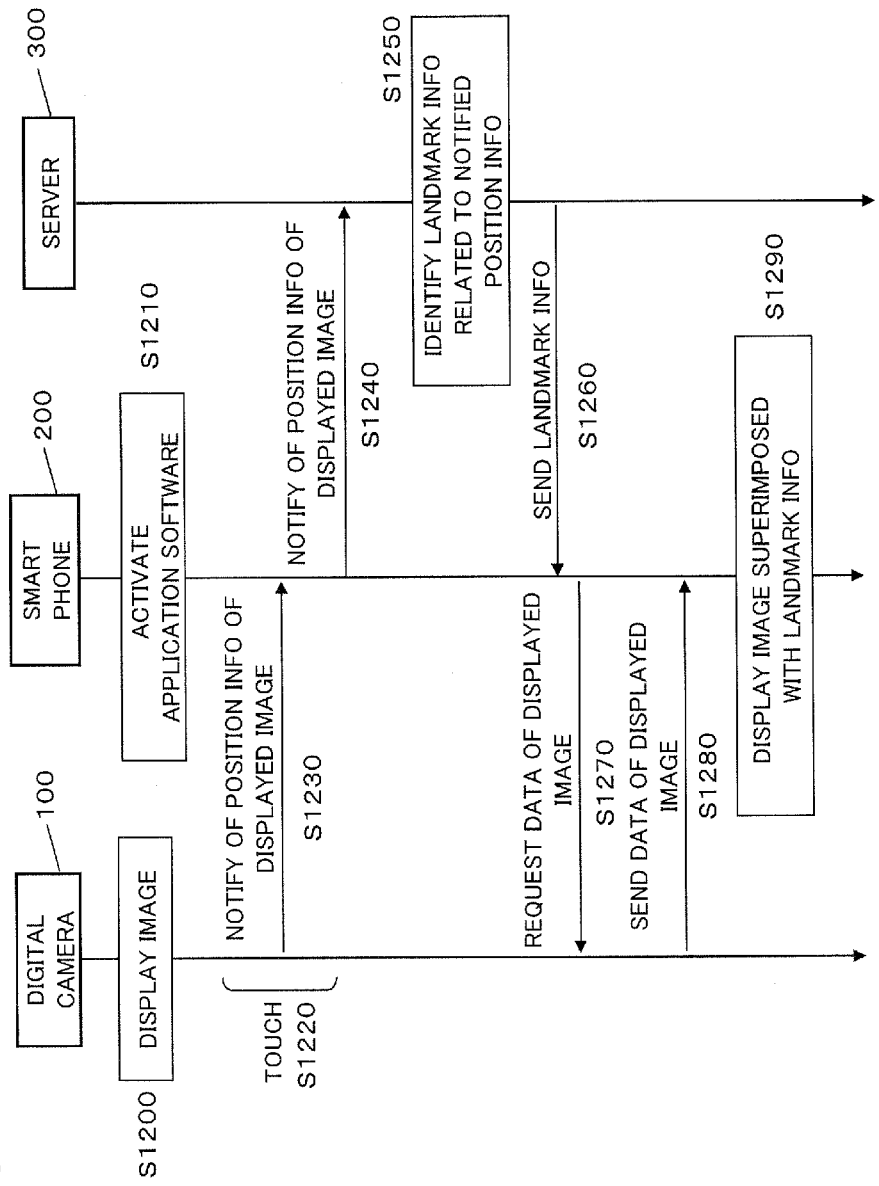
FIG. 20 is a flowchart of operation in the case of acquiring landmark information as reference information.

FIG. 20 is a flowchart of an operation in the case of acquiring landmark information as reference information. The user of the digital camera 100 selects image data with which landmark information is to be acquired, out of the image data recorded in the memory card 145, and displays an image indicated by the selected image data on the liquid crystal display monitor 130. That is, the controller 135 of the digital camera displays an image selected by the user on the liquid crystal display monitor 130 (S1200).

On the other hand, the user operates the touch panel 210 of the smart phone 200 to activate application software. That is, the controller 225 of the smart phone 200 activates application software in accordance with the user's operation (S1210). This application software is application software for acquiring landmark information from the server 300 based on position information of image data read by the smart phone 200 from the digital camera 100. By activating the application software, the smart phone 200 gets prepared for reading position information from the digital camera 100.

Subsequently, the user brings the digital camera 100 and the smart phone 200 into touch with each other (S1220). By this touch operation, the NFC reader/writer 240 of the smart phone 200 reads, from the NFC tag 160 of the digital camera 100, position information indicative of a geographic position where the image data being displayed on the liquid crystal display monitor 130 of the digital camera 100 was shot (S1230).

Figures 21A, 21B:
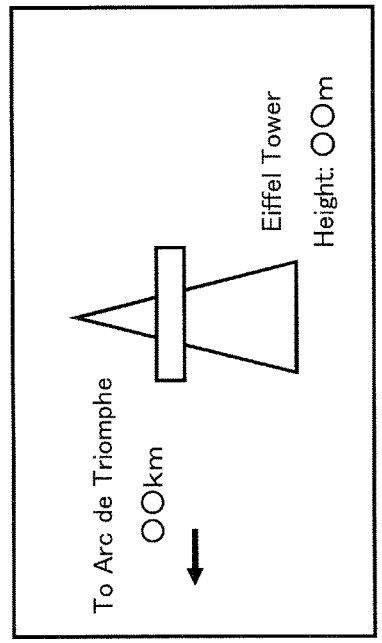
FIGS. 21A and 21B are views showing a correspondence table for landmark information with respect to geographic positions.

The controller 225 of the smart phone 200 notifies the controller 310 of the cloud server 300 of the position information read from the digital camera 100 via the WiFi module 235 and the WiFi module 315 (S1240). The HDD 305 of the cloud server 300 stores a correspondence table between geographic positions and landmark information as shown in FIG. 21A. By referring to the correspondence table shown in FIG. 21A, the controller 310 of the cloud server 300 identifies landmark information related to the notified position information (S1250).

The controller 310 of the cloud server 300 transfers the identified landmark information to the controller 225 of the smart phone 200 via the WiFi module 315 and the WiFi module 235 (S1260). Upon receipt of the landmark information, the controller 225 of the smart phone 200 requests the digital camera 100 to acquire the image displayed on the liquid crystal display monitor 130 (S1270). Upon receipt of the image acquirement request from the smart phone 200, the controller 135 of the digital camera 100 transfers the image being displayed on the liquid crystal display monitor 130 to the smart phone 200 (S1280).

The controller 225 of the smart phone 200 superimposes the image received from the digital camera 100 and the landmark information received from the cloud server 300 on each other, and displays them on the liquid crystal display monitor 215 (S1290). FIG. 21B shows an example of an image in which the landmark information received from the cloud server 300 is superimposed on the image received from the digital camera 100.

In the aforementioned method, the smart phone 200 can easily acquire the landmark information related to the position information of the image being displayed on the touched digital camera 100. This can further facilitate grasping landmark information regarding a place where an image was shot.

(3) Case of Reference Information being Web Page

Figure 22:
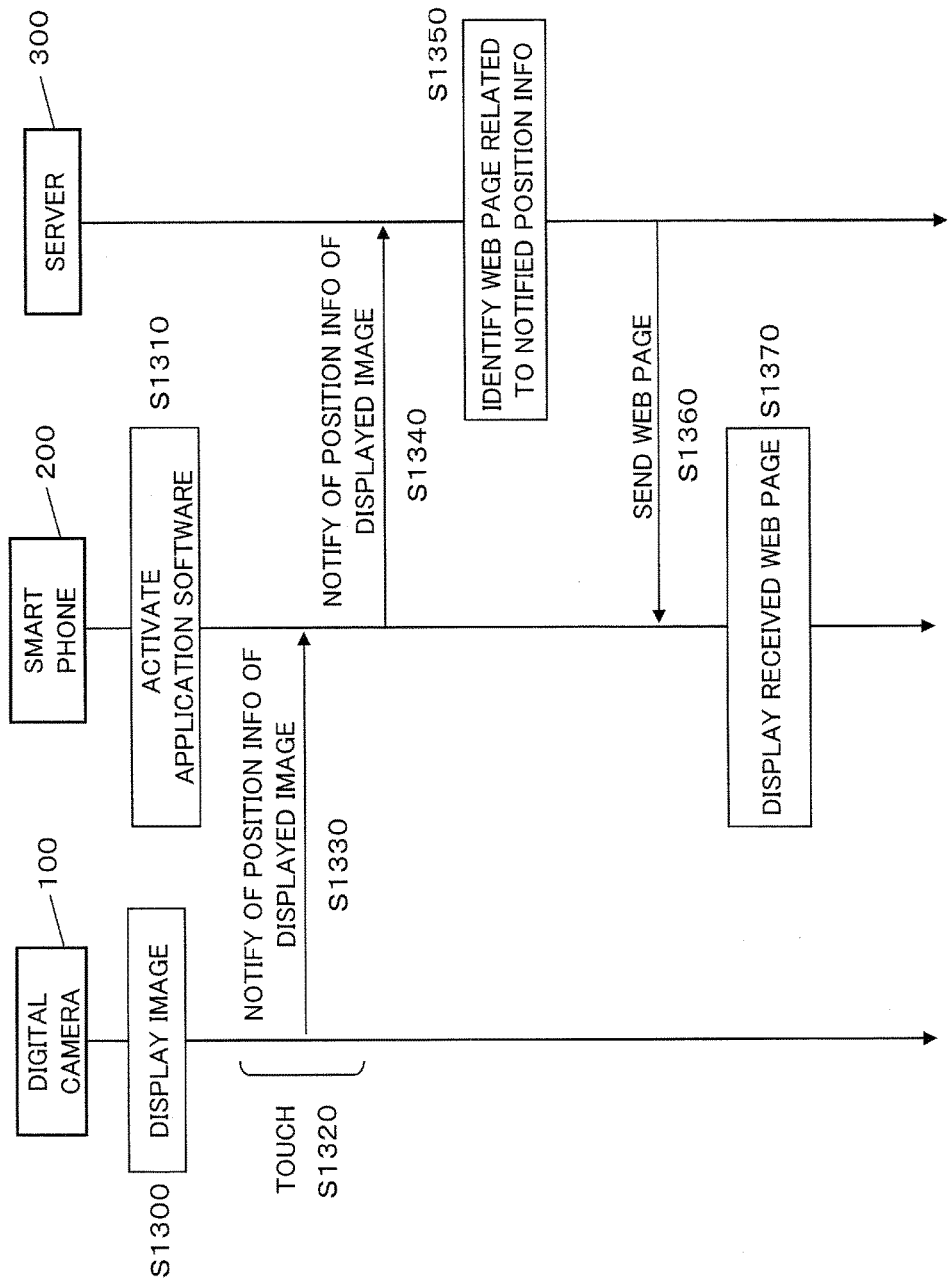
FIG. 22 is a flowchart of operation in the case of acquiring a Web page as reference information.

FIG. 22 is a flowchart of an operation in the case of acquiring a Web page as reference information. Operations in Steps S1300 to Step S1340 shown in FIG. 22 are similar to the operations in Step S1100 to Step S1140 shown in FIG. 19. When receiving the position information of the image from the smart phone 200, the cloud server 300 identifies a Web page related to the received position information (S1350). Subsequently, the controller 310 of the cloud server 300 transfers data of the identified Web page to the controller 225 of the smart phone 200 via the WiFi module 315 and the WiFi module 235 (S1360). The controller 225 of the smart phone 200 displays the received Web page on the liquid crystal display monitor 215 (S1370).

Accordingly, the smart phone 200 can easily display the Web page related to the position information of the image being displayed on the touched digital camera 100.

As described above, the smart phone 200 according to the present embodiment includes the liquid crystal display monitor 215, the NFC reader/writer 240 for reading attribute information of a specific content from the digital camera 100, and the controller 225 for displaying, on the liquid crystal display monitor 215, reference information as information related to the attribute information read by the NFC reader/writer 240. With this configuration, it becomes possible to present even reference information related to an image (content) displayed on the liquid crystal display monitor 215, so as to improve user's convenience.

It is to be noted that in the third embodiment, the information of the image displayed on the digital camera 100 is the information which is to be read by the smart phone 200, but the present disclosure is not limited to this. For example, information manually inputted to the digital camera 100 may be read by the smart phone 200. Alternatively, the current position information indicated by the GPS mounted in the digital camera 100 may be read by the smart phone 200. In this case, it is enough that the GPS is being activated and the digital camera 100 need not necessarily perform the image display operation.

Further, the example of acquiring reference information from the cloud server 300 is described in the third embodiment, but the present disclosure is not limited to this. The cloud server 300 may not be used when data base for providing reference information can be prepared in the smart phone 200.

Other Embodiments

The present disclosure is not limited to the above described embodiments, and a variety of embodiments can be considered. Other embodiments are described together below.

In the above embodiments, reading of information of the digital camera 100 by the smart phone 200 is done when the touch operation after establishment of WiFi connection is done, but the present disclosure not limited to this. That is, reading of information of the digital camera 100 by the smart phone 200 may be done when connection information for establishment of WiFi connection is notified.

In the above embodiments, it is described that the NFC reader/writer 240 of the smart phone 200 reads a variety of information from the NFC tag 160 of the digital camera 100. At this time, the controller 135 of the digital camera 100 may previously write information which is to be read by the smart phone 200 in the memory of the NFC tag 160, or may write the information only after the touch operation is performed.

In the above embodiments, the case of handling image data is described, but the present disclosure is not limited to this. It can also be applied as appropriate to audio data such as music data, and text data. That is, in an example of the first embodiment, in the case of remotely controlling a record/playback apparatus by means of the smart phone 200, a user interface screen which is displayed on the liquid crystal display monitor 215 of the smart phone 200 may be switched depending on whether the mode is a recording mode or a playback mode. In an example of the second embodiment, a music file whose attribute information corresponds to that of music data being played back in the record/playback apparatus may be searched from the memory in the smart phone 200. In an example of the third embodiment, reference information (artist information or text information such as lyrics) regarding music data being played back in the record/playback apparatus may be displayed on the liquid crystal display monitor 215 of the smart phone 200.

In the above embodiments, image sharing between the digital camera and the smart phone has been described as one example, but the combination of apparatuses for sharing an image is not restricted to this. The same technical idea is applicable even to the case of image sharing between digital cameras and the case of image sharing between smart phones.

In the above embodiments, the smart phone 200 includes the flash memory 245 as the recording medium for storing image data. The recording medium for storing image data is not limited to this. The smart phone 200 may store image data in a removable memory card in place of, or in addition to, the flash memory 245.

The controller 135 of the digital camera 100 and the controller 225 of the smart phone 200 are configured of a CPU, an MPU and an FPGA, for example.

As described above, the embodiments are described as illustrations of the technique in the present disclosure. For the above, the attached drawings and the detailed descriptions have been provided.

Accordingly, the constitutional elements described in the attached drawings and the detailed descriptions can include not only constitutional elements essential for solving the problem but also constitutional elements for illustrating the above technique which are not essential for solving the problem. For this reason, those non-essential constitutional elements should not be immediately acknowledged as essential owing to the fact that those non-essential constitutional elements are described in the attached drawings and the detailed descriptions.

Further, since the foregoing embodiments are to illustrate the technique in the present disclosure, a variety of alteration, replacement, addition, omission and the like can be made in the scope of claims or in a scope equivalent thereto.

INDUSTRIAL APPLICABILITY

The technical idea of the present disclosure is not limited to its implementation on the digital camera or the smart phone. That is, the technical idea of the present disclosure can be implemented on another apparatus so long as it is a communication control device capable of communicating an image.

The invention claimed is:

1. An electronic apparatus comprising:
a display unit;
a communication unit configured to read, from another electronic apparatus having a plurality of operation modes capable of being changed independent of the electronic apparatus, information regarding a current operation mode of the another electronic apparatus, the plurality of operation modes including a playback mode for performing a playback operation for recorded image data and a shooting mode for performing a shooting operation; and
a controller configured to change a user interface screen to be displayed on a display unit of the electronic apparatus;
when the electronic apparatus receives the information regarding the playback mode from the another electronic apparatus, the controller controls the display unit of the electronic apparatus to display a first user interface screen corresponding to the information regarding the playback mode, and
when the electronic apparatus receives the information regarding the shooting mode from the another electronic apparatus, the controller controls the display unit of the electronic apparatus to display a second user interface screen corresponding to the information regarding the shooting mode.

2. The electronic apparatus according to claim 1, wherein the another electronic apparatus includes an image capturing unit configured to capture an image of a subject to generate image data,
the shooting mode is an operation mode in which the image capturing unit performs a shooting operation, and
when the information regarding the operation mode read by the communication unit indicates the shooting mode, the controller selects a user interface screen for remotely controlling the shooting operation of the another electronic apparatus, and displays, as the second user interface screen, the selected user interface screen on the display unit.

3. The electronic apparatus according to claim 1, wherein the another electronic apparatus includes a recording medium for recording image data,
the playback mode is an operation mode for performing a playback operation for image data recorded in the recording medium, and when the information regarding the operation mode read by the communication unit indicates the playback mode, the controller selects a user interface screen for playback and displays, as the first user interface screen, the selected user interface screen on the display unit.

4. An electronic apparatus comprising:
a display unit;
a communication unit configured to receive, from another electronic apparatus having a plurality of operation modes capable of being changed independent of the electronic apparatus, including a playback mode for performing a playback operation for recorded image data and a shooting mode for performing a shooting operation, image data recorded in the another electronic apparatus when the another electronic apparatus is in the playback mode, and image data shot in the another electronic apparatus when the another electronic apparatus is in the shooting mode; and
when the electronic apparatus receives the recorded image data from the another electronic apparatus, the electronic apparatus controls the display unit of the electronic apparatus to display a first user interface screen corresponding to the recorded image data, and
when the electronic apparatus receives the shot image data from the another electronic apparatus, the electronic apparatus controls the display unit of the electronic apparatus to display a second user interface screen corresponding to the shot image data.

5. An electronic apparatus comprising:
an image capturing unit configured to generate shot image data;
a setting unit configured to set a specific operation mode from a plurality of operation modes including a playback mode for performing a playback operation for recorded image data and a shooting mode for performing a shooting operation; and
a communication unit configured to send, to another electronic apparatus, the recorded image data when the playback mode is selected by the setting unit, and the shot image data when the shooting mode is selected by the setting unit, wherein
when the another electronic apparatus receives the recorded image data from the communication unit, the another electronic apparatus controls a display unit of the another electronic apparatus to display a first user interface screen corresponding to the recorded image data, and
when the another electronic apparatus receives the shot image data from the communication unit, the another electronic apparatus controls the display unit of the another electronic apparatus to display a second user interface screen corresponding to the shot image data.

6. The electronic apparatus according to claim 5, wherein the communication unit performs communication with a first communication,
the electronic apparatus further comprises a second communication unit that obtains information required for establishing the first communication through the communication unit, using a second communication,
when the another electronic apparatus receives the recorded image data using the first communication after establishing the first communication, the another electronic apparatus controls the display unit of the another electronic apparatus to display the first user interface screen corresponding to the recorded image data, and
when the another electronic apparatus receives the shot image data using the first communication after establishing the first communication, the another electronic apparatus controls the display unit of the another electronic apparatus to display the second user interface screen corresponding to the shot image data.

7. The electronic apparatus according to claim 6, wherein the first communication is WiFi communication, and the second communication is NFC communication.

8. A non-transitory recording medium storing a program for causing an electronic apparatus to:
receive, from another electronic apparatus having a plurality of operation modes capable of being changed independent of the electronic apparatus, including a playback mode for performing a playback operation for recorded image data and a shooting mode for performing a shooting operation, image data recorded in the another electronic apparatus when the another electronic apparatus is in the playback mode, and image data shot in the another electronic apparatus when the another electronic apparatus is in the shooting mode; and
when the electronic apparatus receives the recorded image data from the another electronic apparatus, controls a display unit of the electronic apparatus to display a first user interface screen corresponding to the recorded image data, and
when the electronic apparatus receives the shot image data from the another electronic apparatus, controls the display unit of the electronic apparatus to display a second user interface screen corresponding to the shot image data.

* * * * *